(12) United States Patent
Chen

(10) Patent No.: US 11,809,934 B2
(45) Date of Patent: Nov. 7, 2023

(54) INTELLIGENT POSITIONING TAG AND DIGITAL CURRENCY PAYMENT VISUAL CARD SYSTEM

(71) Applicant: OFIVE LIMITED, Albany, NY (US)

(72) Inventor: Shuping Chen, Shenzhen (CN)

(*) Notice: Subject to any disclaimer, the term of this patent is extended or adjusted under 35 U.S.C. 154(b) by 0 days.

(21) Appl. No.: 18/156,075

(22) Filed: Jan. 18, 2023

(65) Prior Publication Data

US 2023/0316031 A1    Oct. 5, 2023

(30) Foreign Application Priority Data

Mar. 29, 2022  (CN) .......................... 202210317668.3
Aug. 31, 2022  (CN) .......................... 202211062155.9
Aug. 31, 2022  (CN) .......................... 202211075646.7

(51) Int. Cl.
*G06K 19/07*    (2006.01)
*H02J 7/00*     (2006.01)
*G06K 19/077*   (2006.01)

(52) U.S. Cl.
CPC ..... *G06K 19/0723* (2013.01); *G06K 19/0704* (2013.01); *G06K 19/0707* (2013.01); *G06K 19/07707* (2013.01); *H02J 7/0044* (2013.01)

(58) Field of Classification Search
CPC .......... G06K 19/0723; G06K 19/0704; G06K 19/0707; G06K 19/07707; H02J 7/0044
USPC ....................................................... 235/492
See application file for complete search history.

(56) References Cited

U.S. PATENT DOCUMENTS

| | | | | |
|---|---|---|---|---|
| 8,287,386 | B2* | 10/2012 | Miller ................. | G07F 17/3293 463/16 |
| 2015/0227934 | A1* | 8/2015 | Chauhan ............ | G06Q 20/3224 705/44 |
| 2018/0358826 | A1* | 12/2018 | Allen ...................... | H02J 50/10 |
| 2020/0093014 | A1* | 3/2020 | Merenda ........... | H04M 1/72412 |
| 2020/0311509 | A1* | 10/2020 | Benkley, III ............ | G06F 21/32 |
| 2020/0328605 | A1* | 10/2020 | Weber ...................... | H02J 50/10 |
| 2022/0094201 | A1* | 3/2022 | Haug .................... | H02J 50/005 |

FOREIGN PATENT DOCUMENTS

| | | |
|---|---|---|
| CN | 110707833 A | 1/2020 |
| CN | 213279200 U | 5/2021 |
| CN | 113052593 A | 6/2021 |

* cited by examiner

*Primary Examiner* — Michael G Lee
*Assistant Examiner* — David Tardif
(74) *Attorney, Agent, or Firm* — Tsz Lung Yeung

(57) ABSTRACT

A digital currency payment visual card system includes a digital currency payment visual card and a charging assembly, the digital currency payment visual card comprises a card body, a display module provided on the card body, a controller and a positioning module, wherein the controller is arranged to complete transaction payment and output transaction information to the display module for displaying, wherein the positioning module is arranged to generate location information which is sent to an external device for locating the digital currency payment visual card, the charging assembly is a charging wallet or a charging clamp for electrically charging the digital currency payment visual card.

17 Claims, 16 Drawing Sheets

INTELLIGENT POSITIONING TAG AND DIGITAL CURRENCY PAYMENT VISUAL CARD SYSTEM

CROSS REFERENCE OF RELATED APPLICATION

This application is a non-provisional application that claims priority under 35U.S.C. § 119 to China application number CN202210317668.3, filing date 03/29/2022, China application number CN202211075646.7, filing date 08/31/2022, China application number CN202211062155.9, filing date 08/31/2022, which are incorporated herewith by references in their entities.

BACKGROUND OF THE PRESENT INVENTION

Field of Invention

The present invention relates to positioning technology, and more particularly to an intelligent positioning tag and application thereof.

DESCRIPTION OF RELATED ARTS

A smart positioning tag is an accessory solution based on Apple's Find My Network framework using BLE technology to provide positioning functions through Apple's Find My network, so as to provide an excellent anti-lost experience of an object of a user.

There are many types of conventional smart positioning tags on the market, which can basically meet people's needs, but there are still some problems. The specific problems are as follows: First, it is difficult for smart positioning tags to recognize the prompt sound in a noisy environment, which seriously affects convenience when using smart positioning tags; secondly, smart positioning tags cannot support buttons when in use, making it difficult to switch between different devices; thirdly, the thickness of smart positioning tags on the market is generally thick, which makes it not convenient enough to carry.

When making a positioning tag which is a smart card, components or modules such as ultra-thin lithium batteries, chips, solar panels, fingerprints, and ink screens need to be packaged inside a plastic card at room temperature. Adhesive is one of the most important auxiliary materials for smart card packaging, it can use its adhesive properties to connect two separate materials together. Currently, adhesives mainly rely on the strong force generated by hydrogen bonds between polymers, but traditional adhesives often cannot form sufficient density of hydrogen bonds. The reason is that high viscosity means low fluidity, and the balance of the combination of viscosity and fluidity cannot be achieved. In addition, the adhesive seldom is added with curing accelerators, so that it cannot improve the curing reaction speed, which seriously affects the reaction time of chemical substances.

Currently, with the large-scale construction of 4G/5G networks and the popularization of smart phones, mobile payment has become more and more widely used, and the mobile payment system has been very complete. However, since mobile payment, like electronic payment, needs to be associated with a bank account, and transactions require at least one party to have a network connection, so there are restrictions on payment. While digital currency is currently positioned as an alternative to cash, and both parties can conduct offline transactions without network conditions, so that the digital currency, as a payment method, provides an effective complement to the existing electronic payment systems and mobile payment systems form. For this reason, more and more people start to use smart cards as the carriers of digital currency, so as to use digital currency for transactions.

Traditional magnetic stripe bank cards have little information capacity and have certain potential safety hazards. Financial IC cards and their extended visual smart cards are gradually replacing the original traditional magnetic stripe bank cards, financial IC cards are also called chip bank cards, which use chips as the medium bank card, the chip card has a large capacity, and can store information such as keys, digital certificates, and fingerprints. After adopting electrically displaying technology such as electronic paper, non-sensitive information such as electronic cash balance, transaction details and custom data of the issuing bank can be displayed. However, the conventional visual smart card has no positioning function, and the user cannot quickly obtain the location of the visual smart card after the visual smart card is lost.

SUMMARY OF THE PRESENT INVENTION

The invention is advantageous in that it provides a multifunctional intelligent positioning tag which is used to prevent items from being lost, and to solve the problems in the above mentioned conventional technology that it is difficult to recognize the prompt sound in a noisy environment, difficult to realize the switching status of different devices, and the thickness is generally thick.

Another advantage of the present invention is to provide a polymer adhesive used for sealing and pressing of smart cards with the positioning tag and its preparation method, so as to solve the problem that the balance function of viscosity and fluidity cannot be realized and the curing reaction speed cannot be improved in the above mentioned conventional technology.

Another advantage of the present invention is to provide a digital currency payment visual card with a positioning function and a charging system to solve the problem that the visual smart card in the prior art has no positioning function.

Additional advantages and features of the invention will become apparent from the description which follows, and may be realized by means of the instrumentalities and combinations particularly pointing out in the appended claims.

According to the present invention, the foregoing and other objects and advantages are attained by an intelligent positioning tag comprises a hanging or built-in card body, wherein two sides of the bottom of the card body are respectively provided with a light emitting device and a button, a rechargeable battery is installed inside the card body, and a microprocessor, a buzzer, a Bluetooth module, a memory and an acceleration sensor are also embedded in the card body, the microprocessor is electrically connected to the acceleration sensor, the buzzer, the Bluetooth module and the memory respectively, the card body has a built-in Find My protocol, and the Find My protocol is connected to a server, the top of back of the card body is provided with a hanging mechanism.

Preferably, each of the four corners of the back of the card body is provided with a warning assembly or an adhesive assembly.

Preferably, the thickness of the card body does not exceed 1.6 mm.

Preferably, the hanging mechanism has a receiving groove and comprises a hanging piece, a locking assembly and a sliding assembly. The receiving groove is opened at the center of the top of the card body, and the inside of the receiving groove is provided with the hanging piece which slides in the receiving groove with the aid of the sliding assembly, and at the same time the hanging piece is locked to the receiving groove by the locking assembly.

Preferably, a surface of the hanging piece is provided with a hanging groove 1621 for hanging. The locking assembly comprises two buckle block provided on the surface of the receiving groove, and two buckle grooves disposed on two sides of the hanging piece, and the buckle grooves and the buckle blocks are engaged with each other.

Preferably, the sliding assembly comprises two sliding blocks on two sides of the receiving groove, and the two sliding blocks slidably coupled with two sliding grooves which are disposed in the hanging piece.

Preferably, when the card body is used in a hanging mode, each of the four corners of the back of the card body is provided with the warning assembly for warning. Each of the warning assembly has a groove, and comprises a fluorescent sheet and a plurality of buffering protrusions, and the groove is opened at each of the four corners of the card body.

Preferably, the fluorescent sheet is pasted inside the corresponding groove, and the surface of the fluorescent sheet is inlaid with the plurality of buffering protrusions at equal intervals.

Preferably, when the card body is used in the built-in mode, each of the four corners of the back of the card body is provided with an adhesive assembly, and each of the adhesive assemblies has a glue groove, and comprises a double-sided adhesive tape and a release paper, wherein four glue grooves are respectively provided at the four corners of the card body.

Preferably, each of the glue grooves is glued with a double-sided adhesive, and the surface of the double-sided adhesive is covered with the release paper.

The present invention provides a method for manufacturing the intelligent positioning tag which used to prevent an item from being lost, and the method comprises the following steps.

The corresponding electronic components are welded and the buttons are installed.

Perform a firmness test on soldered electronic devices and installed buttons.

After passing the test, use adhesive for packaging.

After the packaging is completed, die-cutting is carried out, followed by packaging, appearance inspection, and performance testing.

Compared with the prior art, the beneficial effect of the present invention is that: the multifunctional intelligent positioning tag for preventing items from being lost supports a buzzer, has a high volume, and can recognize prompt sounds even in a noisy environment; and supports keys for switching between different device states according to needs, such as enabling pairing broadcast, enabling serial number search and restoring factory settings. At the same time, a rechargeable ultra-thin lithium battery is used, and there is no need for complicated battery replacement operations. The charging method is magnetically attracting and charging or wireless charging, and the thickness is market-leading.

The present invention provides a polymer adhesive used for sealing and pressing components of the above mentioned intelligent positioning tag. The polymer adhesive is mainly consisting of main materials and auxiliary materials. The main materials comprise the following raw materials in parts by weight: 25-30 parts of epoxy resin, 15-20 parts of phenolic resin, 11-13 parts of polyolefin resin, 6-10 parts of urea-formaldehyde resin, 9-15 parts of polyvinyl acetate, 5-8 parts of sodium alginate, 4-6 parts of rosin gum, 3-5 parts of Acrylic stearate, and 30-50 parts of water.

Preferably, the auxiliary materials comprise the following raw materials: diisocyanate, dibutyl phthalate, ammonium chloride, urotropine, etc. Calcium carbonate and lactic acid inorganic substances are used as additives.

Preferably, the polymer adhesive comprise a thickener, the thickener is 2-6 parts of hydroxyethyl cellulose, and the hydroxyethyl cellulose can increase the viscosity of the adhesive, thereby increasing the viscosity of the adhesive.

Preferably, a solvent is added to the polymer adhesive, the solvent is a diluent for the acrylate monomer, and the solvent and the thickener are prepared in a reasonable ratio, the ratio is:0.05-0.3:1-2.

Preferably, the polymer adhesive is added with a coloring agent, an anti-aging agent and a crosslinking agent, the coloring agent is pigment, the anti-aging agent is methyl phenol, and the crosslinking agent is vinyl triethoxysilane.

Preferably, the polymer adhesive also comprises a curing accelerator, which is a chemical substance that can accelerate the curing reaction speed and shorten the reaction time.

The present invention also provides a method for preparing a polymer adhesive used for sealing and pressing of components of the above mentioned intelligent positioning tag, the method comprises the following steps.

Step 1: 25-30 parts of epoxy resin, 15-20 parts of phenolic resin, 11-13 parts of polyolefin resin, 6-10 parts of urea-formaldehyde resin and 20-30 parts of water are mixed and stirred, and add anti-aging agent after being stirred evenly, stir under 20-30° C. for 20-30 minutes.

Step 2: 9-15 parts of polyvinyl acetate, 5-8 parts of sodium alginate and 3-5 parts of acrylic stearate are mixed into 10-20 times of water, and add 4-6 parts of remaining rosin gum under stirring condition.

Step 3: Mix the above-mentioned treated raw materials, add auxiliary materials and curing accelerators, heat to normal temperature under stirring conditions, and add calcium carbonate to adjust the pH to 6-6.5, and obtain the base liquid after uniform stirring at normal temperature.

Step 4: Add the thickener and solvent into the base liquid at a ratio of 0.05-0.3:1-2, stir to dissolve, add lactic acid, adjust the pH of the system to 4-5, stir and mix for 4-5 hours, and then add a crosslinking agent.

Step 5: Mix the base liquid and the crosslinking agent, stir and mix at 20-25° C. for 30-40 minutes, discharge and cool to obtain organogel.

Step 6: Mix the above-mentioned organogel with the remaining raw materials, heat and stir for 1-2 hours at room temperature 20-25° C., continue add the remaining raw materials and stir for 30-40 minutes, cool in a water tank, dehydrate, and vacuum-dry to obtain the product.

The equipment used for mixing and stirring the polymer adhesive is a disperser, the rotating speed range of the disperser is 500-1500 rpm, and the temperature range during stirring is 10-30° C.

The polymer adhesive used for adhering, sealing and pressing of components of the intelligent positioning tag and its preparation method can increase the viscosity of the adhesive by introducing a thickener. At the same time, it is used in conjunction with a solvent, and the solvent and the thickener are prepared in a reasonable ratio, so that the viscous agent delicately balances fluidity and viscosity, which can effectively form a more stable bonding. Meanwhile, the polymer adhesive can accelerate the curing reaction speed and shorten the reaction time by adding a curing accelerator.

The present invention provides a digital currency payment visual card with positioning function comprising a card body and a display module, a controller and a positioning module arranged on the card body, wherein the controller is communicated and electrically connected with the display module and the positioning module, and the controller is used to receive transaction request information transmitted by an external device to complete transaction payment and output transaction information which is sent to the display module for displaying, the positioning module is used to generate location information which is sent to the external device.

In this way, the transaction request information transmitted by the external device is received by the controller to complete the transaction payment, and the transaction information is sent to the display module for displaying, which is convenient for the user to view the transaction data intuitively. At the same time, the positioning module sends the location information to the external device to achieve positioning of the digital currency payment visual card with positioning function.

In some embodiments, the display module comprise a display for displaying the transaction information. The transaction information is displayed on the display to help the user quickly acknowledges the specific content of the transaction, so as to make the transaction process intuitive and visible.

In some embodiments, the display comprise at least one of a liquid crystal display and an electronic ink screen. By setting the display to comprise at least one of a liquid crystal display and an electronic ink screen, an appropriate screen can be selected according to actual needs to achieve the best displaying effect.

In some embodiments, the digital currency payment visual card with positioning function also comprises a solar charging board, which is located on the surface of the card body, and the solar charging board is electrically connected to the display module, the controller respectively, and the positioning module for power supply, so as to to prolong service life of the digital currency payment visual card with positioning function.

In some embodiments, the digital currency payment visual card with positioning function comprises a button located on the card body, and the button is used to control the opening and closing of the controller, so as to realize the opening and closing of the transaction, so that it can save power and prolong battery life.

In some embodiments, the positioning module comprises a transaction identification module which is communicated to the controller for obtaining transaction user information when the controller performs transaction payment, and based on the transaction user information, based on the obtained transaction user information, location information of the current payment location is obtained and sent to the external device such as electrical terminal of owner of digital currency payment visual card with positioning function and a networked system of the bank and public security, so as to help the user to locate and find lost card.

In some embodiments, the positioning module comprises a Bluetooth module which is used to generate the position information when it is recognized that it is in a preset payment area. By using the Bluetooth device to receive the message within the preset payment area, so that when a person holds the digital currency payment visual card with positioning function to pay in the preset payment area, the Bluetooth module will receive the signal and generate position information in the preset payment area, and send it to default receiving device in the area, and also send it to the smart terminal held by the owner of the digital currency payment visual card with positioning function, or network system of the electric terminal, the bank and the public security, so as to help the user to locate and find the lost card.

The present invention also provides a charging system comprising the digital currency payment visual card with positioning function and a charging wallet which comprises a first part and a second part, wherein the first part and the second part can be relatively foldable to be close to or away from each other, wherein the first part or the second part is provided with a power supply component, and when the first part is folded, a magnetic attracting element is provided on a surface facing the second par to attract the card body between the first part and the second part, and the power supply component can be used to charge the digital currency payment visual card with positioning function.

In this way, the card body is sandwiched between the foldable first part and the second part of the charging wallet through the magnetic attracting element, which is convenient for access, and at the same time avoids placing the card body with a certain thickness in an inter layer of the charging wallet to result in deformation of the charging wallet. The digital currency payment visual card with positioning function is charged by the power supply component when the card body is placed in the charging wallet, so that the service life of the digital currency payment visual card with positioning function is increased.

In some embodiments, the charging wallet comprises an electrostatic conversion device for converting static electricity into charging electricity for charging the digital currency payment visual card with positioning function.

In some embodiments, the first part is provided with first connectors on a surface thereof, the card body is provided with second connectors, and the first connectors are electrically connected to the electrostatic conversion device, so that when the card body is attracted by the magnetic member between the first part and the second part, the first connectors are respectively electrically connected to the second connectors, so that the electrostatic conversion device can charge the digital currency payment visual card with positioning function.

In some embodiments, the power supply component is arranged in the second part, and the surface of the second part facing the first part after being folded is provided with first charging contacts, and the charging wallet is configured as when the first part and the second part are folded into a stacked arrangement, the first charging contacts are magnetically attracted to the second charging contacts on the card body to charge the card. The charging wallet is also configured in such a manner that when the first part and the second part are opened, the first charging contacts are separated from the corresponding second charging contacts, and the card body obtains the position information of the current position and the corresponding time information, and transmit the location information and the time information to a terminal device.

The present invention also provides a digital currency payment visual card system, comprising: a digital currency payment visual card and a charging assembly, the digital currency payment visual card comprises a card body, a display module provided on on the card body, a controller and a positioning module, wherein the controller is communicated with the display module and the positioning module, wherein the controller is arranged to complete transaction payment and output transaction information to the display module for displaying, wherein the positioning module is arranged to generate location information which is sent to an external device for locating the digital currency payment visual card, the charging assembly is arranged for electrically charging the digital currency payment visual card.

In some embodiments, the positioning module comprises a transaction recognition module which is connected and communicated with the controller for obtaining transaction user information when the controller is carrying out transaction and generating the location information related to the transaction user information based on merchant information of a counterparty of the transaction.

In some embodiments, the charging assembly is a charging wallet comprising a first part, a second part, a power supply component, and a magnetic attracting element, wherein the first part and the second part are relatively foldable to be close to or away from each other, wherein the power supply component is provided on one of the first part and the second part, wherein when the first part is folded to the second part, the magnetic attracting element is arranged to attract the card body of the digital currency payment visual card between the first part and the second part so as to allow the power supply component to charge the digital currency payment visual card.

In some embodiments, the charging assembly is a charging wallet comprising a first part, a second part, an electrostatic conversion device for converting static electricity from a human body, and a magnetic attracting element, wherein the first part and the second part are relatively foldable to be close to or away from each other, wherein the electrostatic conversion device is provided on one of the first part and the second part, wherein when the first part is folded to the second part, the magnetic attracting element is arranged to attract the card body of the digital currency payment visual card between the first part and the second part so as to allow the electrostatic conversion device to charge the digital currency payment visual card.

In some embodiments, one of the first part and the second part is provided with two first connectors on a surface thereof, wherein the card body is provided with two second connectors, and the first connectors are electrically connected to the power supply component, wherein when the card body is attracted by the magnetic member between the first part and the second part, the first connectors are respectively electrically connected to the second connectors, so that the power supply component is used to charge the digital currency payment visual card.

In some embodiments, one of the first part and the second part is provided with two first connectors on a surface thereof, wherein the card body is provided with two second connectors, and the first connectors are electrically connected to the electrostatic conversion device, wherein when the card body is attracted by the magnetic member between the first part and the second part, the first connectors are respectively electrically connected to the second connectors, so that the electrostatic conversion device is used to charge the digital currency payment visual card.

In some embodiments, the charging assembly comprises a charging clamp which comprises a charging unit and a clamp body, wherein the clamp body comprises a base board and a movable clip which is pivotally movable with respect to the base board defining a clamping slot, wherein the digital currency payment visual card comprises a charging end portion, wherein when the charging end portion of the digital currency payment visual card is inserted into the clamping slot and is retained between the movable clip and the base body, the charging unit is electrically connected to the charging end portion of the digital currency payment visual card.

In some embodiments, the charging unit comprises a charging circuit and two charging pins electrically connected to the charging circuit, wherein the charging end portion of the digital currency payment visual card comprises two charging contact areas which are respectively electrically connected to the two charging pins when the charging end portion of the digital currency payment visual card is retained in the clamping slot.

In some embodiments, the movable clip has a receiving cavity for receiving the charging circuit and comprises an assembling plate under the charging circuit to separate the charging circuit from the charging end portion of the digital currency payment visual card, wherein the assembling pate has two penetrating holes for the two charging pins to pass therethrough.

In some embodiments, the charging clamp further comprises a retaining pad made of anti-skidding material on the base board for retaining the charging end portion of the digital currency payment visual card in the clamping slot when the charging end portion of the digital currency payment visual card is inserted into the clamping slot.

In some embodiments, the base board comprises a board body and a stopper member extended from the board body to block movement of the charging end portion of the digital currency payment visual card, so as to retain the charging end portion of the digital currency payment visual card in the clamping slot.

In some embodiments, the base board comprises a board body and a stopper member extended from the board body to block movement of the charging end portion of the digital currency payment visual card, so as to retain the charging end portion of the digital currency payment visual card in the clamping slot.

In some embodiments, the board body has an accommodating groove for receiving the retaining pad.

In some embodiments, the charging unit further comprises an electrical connecting interface electrically connected to the charging circuit.

In some embodiments, the charging assembly further comprises an electrical connecting wire that is arranged to be electrically connected to the electrical connecting interface, and an electrical connector plug that is electrically connected to the electrical connecting wire.

In some embodiments, the clamp body further comprises a resetting mechanism which comprises a pivot pin connected to the movable clip and the base board, one or more torsional springs connected to the pivot pin between the movable clip and the base board for restoring original position of the movable clip when the charging end portion of the digital currency payment visual card is removed from the clamping slot.

In some embodiments, the base board comprises a board body and two fixing members extended from the board body at two sides thereof, wherein the movable clip comprises a clip body and two retaining members extended from the clip body at two sides thereof, wherein each end of the pivot pin is connected to one the fixing member and one the retaining member.

Still further objects and advantages will become apparent from a consideration of the ensuing description and drawings.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
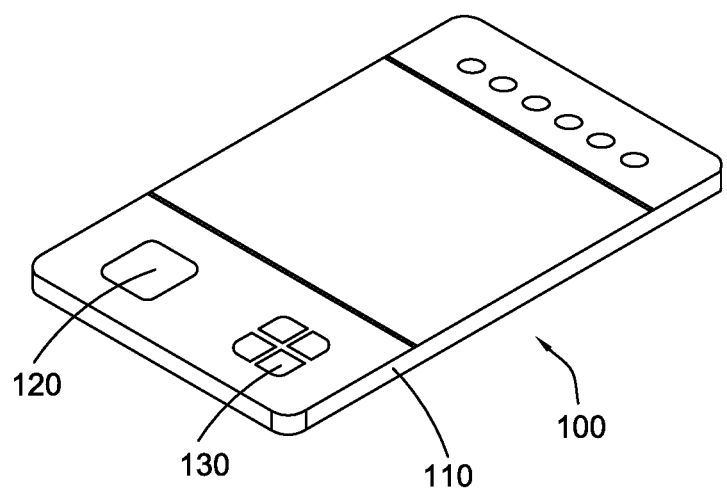
FIG. 1 is a perspective view of an intelligent positioning tag according to a preferred embodiment of the present invention.
Figure 2:
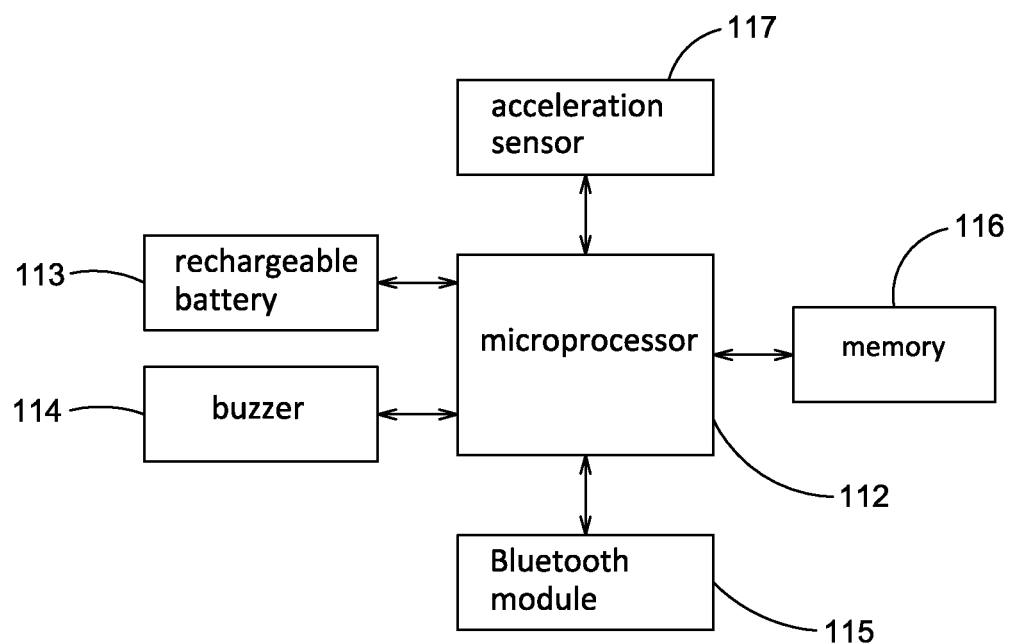
FIG. 2 is a diagram showing internal composition of the intelligent positioning tag according to the above preferred embodiment of the present invention.

Referring to FIGS. 1 and 2 of the drawings, a multifunctional intelligent positioning tag 100 which is used to prevent an item from being lost according to a preferred embodiment of the present invention is shown and illustrated. The intelligent positioning tag 100 comprises a hanging or built-in card body 110, and the thickness of the card body 110 does not exceed 1.6 mm, the two sides of the bottom of the card body 1 are respectively provided with a light emitting device 120 and a button 130.

Further, as shown in FIG. 2, a rechargeable battery 113 is installed inside the card body 110, and a microprocessor 112, a buzzer 114, a Bluetooth module 115, a memory 116 and an acceleration sensor 117 are also embedded in the card body 110. The microprocessor 112 is electrically connected to the acceleration sensor 117, the buzzer 114, the Bluetooth module 115 and the memory 116 respectively.

The battery 113 can be a rechargeable ultra-thin lithium battery, the button 130 is a patch-type mechanical button, the buzzer 114 is a piezoelectric buzzer, and the acceleration sensor 117 is a three-axis accelerometer.

Figure 3:
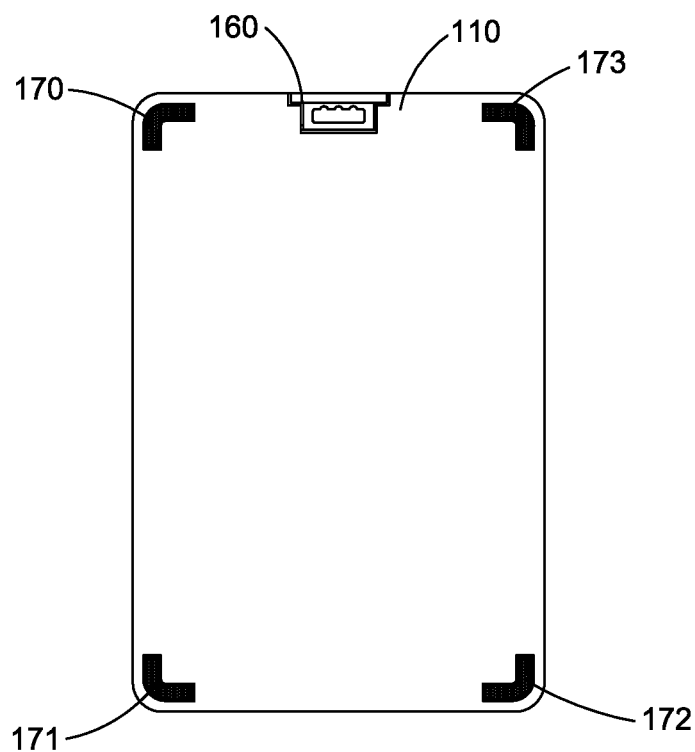
FIG. 3 is a schematic view showing a warning assembly at the back of the intelligent positioning tag according to the above preferred embodiment of the present invention.

Further, as shown in FIG. 3, each of the four corners of the back of the card body 110 is provided with a warning assembly 170 for warning when the card body 110 is embodied as a hanging card. Each of the warning assembly 170 has a groove 171, and comprises a fluorescent sheet 172 and a plurality of buffering protrusions 173, and the groove 171 is opened at each of the four corners of the card body 110, the fluorescent sheet 172 is pasted inside the corresponding groove 171, and the surface of the fluorescent sheet 172 is inlaid with the plurality of buffering protrusions 173 at equal intervals.

During implementation, the warning assembly 170 is used to provide a warning effect at night. When an item falls at night, if the front of the card body 110 is facing up, the light will flash through the light emitting device 120 to assist in finding the item; if the back of the card body 110 is facing up and the lighting emitting device 120 is hidden and covered, the internal fluorescent sheets 172 in the grooves 171 will provide a warn effect, and the buffering protrusions 173 on the surface of the fluorescent sheets 172 can realize the buffering function when falling.

Specifically, the main body of the card body 110 has a built-in Find My protocol, and the Find My protocol is connected to a server. When the Bluetooth module 115 cannot be used at a far away distance, the item can be retrieved through the Find My protocol.

During implementation, the positioning tag 100 is connected and paired with an Apple device through the Find My app, and the item is associated with the logged-in Apple ID on the device to realize the related functions of Find My app.

Items that have implemented the Find My network protocol can also be retrieved. When retrieving, because Apple devices such as Pad, iPhone, and Macbook (paired with the Find My function) constitute a huge network, for example, when bringing a device that supports Find My to travel, although the item itself cannot be located without GPS, the Apple device in this network can provide its own GPS data associated with the Apple ID of the item, and upload it to Apple's server. The server is responsible for receiving the encrypted data. The location-related data is saved and stored, and the owner can decrypt and read the original location information from the encrypted data, so as to realize the retrieval function of the item.

Figure 4:
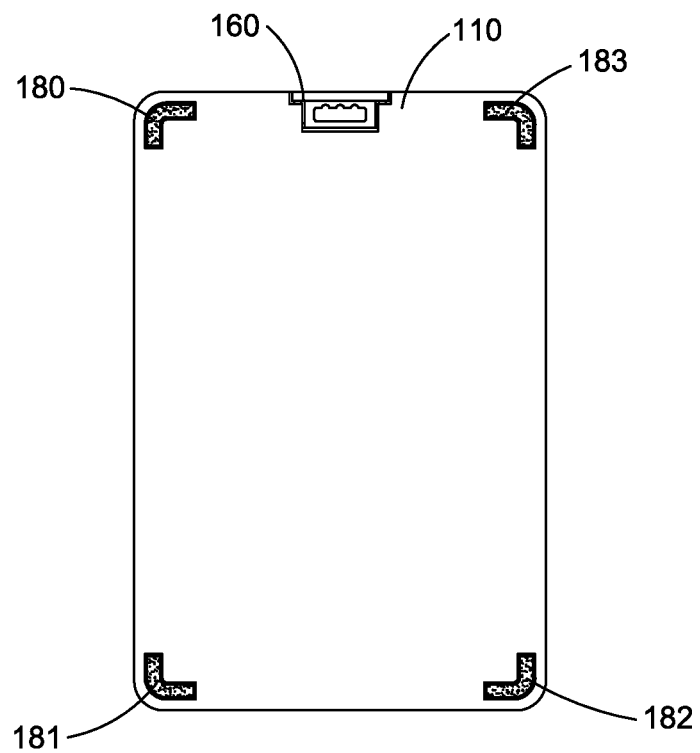
FIG. 4 is a schematic view showing an adhesive assembly at the back of the intelligent positioning tag according to the above preferred embodiment of the present invention.

Further, as shown in FIG. 4, when the card body 110 is in the built-in mode, each of the four corners of the back of the card body 110 is provided with an adhesive assembly 180, and each of the adhesive assemblies 180 has a glue groove 181, a double-sided adhesive tape 182 and a release paper 183. Accordingly, four glue grooves 181 are respectively provided at the four corners of the card body 110, each of the glue grooves 181 is glued with a double-sided adhesive 182, and the surface of the double-sided adhesive 182 is covered with a release paper 183.

During implementation, the release paper 183 is peeled off, and the double-sided adhesive tape 182 in the corresponding glue groove 181 facilitates the positioning of the positioning tag 100 to stick to the surface of an article.

Figure 5A:
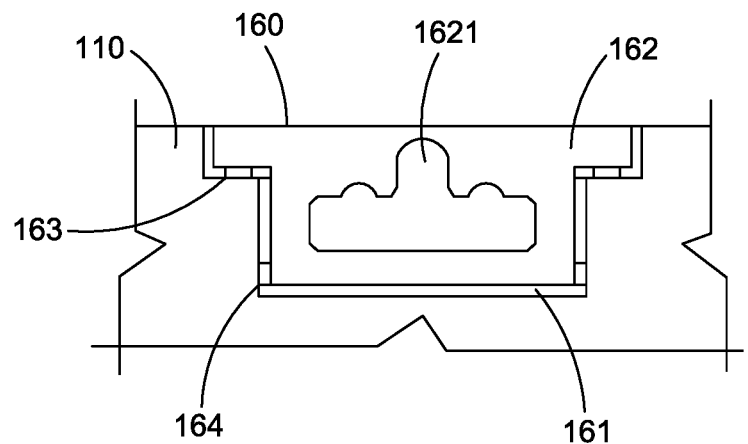
FIG. 5A is an enlarged partial schematic view showing a hanging mechanism of the intelligent positioning tag according to the above preferred embodiment of the present invention.
Figure 5B:
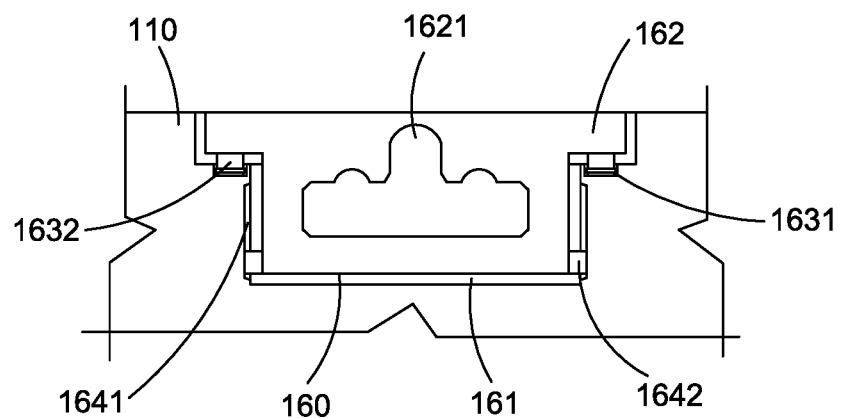
FIG. 5B is an enlarged partial sectional view showing the hanging mechanism of the intelligent positioning tag according to the above preferred embodiment of the present invention.

Further, as shown in FIG. 5A and FIG. 5B, the top of the back of the card body 110 is provided with a hanging mechanism 160 which has a receiving groove 161 and comprises a hanging piece 162, a locking assembly 163 and a sliding assembly 164. The receiving groove 161 is opened at the center of the top of the card body 110, and the inside of the receiving groove 161 is provided with the hanging piece 162 which slides in the receiving groove 161 with the aid of the sliding assembly 164, and at the same time the hanging piece 162 is locked to the receiving groove 161 by the locking assembly 163. A surface of the hanging piece 162 is provided with a hanging groove 1621 for hanging. The locking assembly 163 comprises at least a buckle block 1631 and has at least a buckle groove 1632. According to this embodiment, two buckle block 1631 are provided on the surface of the receiving groove 161, two buckle grooves 1632 are respectively fixedly disposed on both sides of the hanging piece 162, and the buckle groove 1632 and the buckle block 1631 are engaged with each other. The sliding assembly 164 comprises at least a sliding block 1641 and at least a sliding groove 1642. In this embodiment, two sliding blocks 1641 are set on both sides of the receiving groove 161, and the two sliding blocks 641 are slidably coupled with two sliding grooves 1642 which are disposed in the hanging piece 162.

During usage, the hanging piece 162 is pulled so that the buckle blocks 1631 and the buckle grooves 1632 are separated from each other, so that the hanging piece 162 can be slid out from the inside of the receiving groove 161 under the sliding cooperation of the sliding blocks 1641 and the sliding grooves 1642, so that the hanging groove 1621 can be used for hanging.

Furthermore, the multifunctional intelligent positioning tag 100 used to prevent an item from being lost is packaged by integrated packaging and pressing technology, and the packaging process comprises the following steps.

The corresponding electronic components are welded and the buttons are installed.

Perform a firmness test on soldered electronic devices and installed buttons.

After passing the test, use adhesive for packaging.

After the packaging is completed, die-cutting is carried out, followed by packaging, appearance inspection, and performance testing.

Through this packaging method, packaging under normal temperature conditions to is realized, and the high performance and reliability of the positioning label can be guaranteed, and various process effects on the surface of the positioning label can be realized, such as matte/glossy/UV effect/drawing effect.

The working principle of the intelligent positioning tag 100 is illustrated in the following description. When in use, connect and pair the intelligent positioning tag 100 with the device through the Find My software, and then equip the intelligent positioning tag 100 on the item. If built-in mode is required, it is completed by sticking the adhesive assembly 180. More specifically, the release paper 183 is peeled off and the double-sided adhesive tape 182 inside the glue groove 181 is then used for adhering.

If it is necessary to hang the intelligent positioning tag 100, it is completed by the hanging mechanism 160. When the hanging mechanism 160 is implemented, the buckle blocks 1631 are separated from the buckle grooves 1632 by pulling the hanging piece 162, so that the hanging piece 162 is separated to slide out from the inside of the receiving groove 161 through the engagement between the sliding blocks 1641 and the sliding grooves 642, and then hangs the intelligent positioning tag 100 on an environment object through the hanging groove 1621. At the same time, when hanging, the warning assembly 170 is used to warn at night. When the item with the intelligent positioning tag 100 falls at night, if the front of the card body 110 is facing up, the light will flash through the light emitting device 120 to assist in finding the item; if the back of the card body 110 is facing up and the lighting emitting device 120 is hidden and covered, the internal fluorescent sheets 72 in the grooves 171 will provide a warn effect, and the buffering protrusions 73 on the surface of the fluorescent sheets 72 can realize the buffering function when falling.

When the intelligent positioning tag 100 is used, the user can use the touch button 130 to trigger state switching of the item device, such as turning on the pairing broadcast, restoring the factory settings and other operations. At the same time, the intelligent positioning tag 100 comprises the built-in acceleration sensor 117, which is an acceleration three-axis sensor. The built-in acceleration sensor 117 can detect the movement of the item and give an alarm when there is an unknown movement of the item, but this function requires the item to be in a separated state, and this detection is not performed when it is connected to the paired device.

The present invention provides a polymer adhesive used for sealing and pressing components of the above mentioned intelligent positioning tag 100. The polymer adhesive is mainly consisting of main materials and auxiliary materials. The main materials comprise the following raw materials in parts by weight: 25-30 parts of epoxy resin, 15-20 parts of phenolic resin, 11-13 parts of polyolefin resin, 6-10 parts of urea-formaldehyde resin, 9-15 parts of polyvinyl acetate, 5-8 parts of sodium alginate, 4-6 parts of rosin gum, 3-5 parts of Acrylic stearate, and 30-50 parts of water.

The auxiliary materials comprise the following raw materials: diisocyanate, dibutyl phthalate, ammonium chloride, urotropine, etc. Calcium carbonate and lactic acid inorganic substances are used as additives.

The polymer adhesive comprise a thickener, the thickener is 2-6 parts of hydroxyethyl cellulose, and the hydroxyethyl cellulose can increase the viscosity of the adhesive, thereby increasing the viscosity of the adhesive.

A solvent is added to the polymer adhesive, the solvent is a diluent for the acrylate monomer, and the solvent and the thickener are prepared in a reasonable ratio, the ratio is:0.05-0.3:1-2.

The polymer adhesive is added with a coloring agent, an anti-aging agent and a crosslinking agent, the coloring agent is pigment, the anti-aging agent is methyl phenol, and the crosslinking agent is vinyl triethoxysilane.

The polymer adhesive also comprises a curing accelerator, which is a chemical substance that can accelerate the curing reaction speed and shorten the reaction time.

The present invention also provides a method for preparing a polymer adhesive used for sealing and pressing of components of the above mentioned intelligent positioning tag 100, the method comprises the following steps.

Step 1: 25-30 parts of epoxy resin, 15-20 parts of phenolic resin, 11-13 parts of polyolefin resin, 6-10 parts of urea-formaldehyde resin and 20-30 parts of water are mixed and stirred, and add anti-aging agent after being stirred evenly, stir under 20-30° C. for 20-30 minutes.

Step 2: 9-15 parts of polyvinyl acetate, 5-8 parts of sodium alginate and 3-5 parts of acrylic stearate are mixed into 10-20 times of water, and add 4-6 parts of remaining rosin gum under stirring condition.

Step 3: Mix the above-mentioned treated raw materials, add auxiliary materials and curing accelerators, heat to normal temperature under stirring conditions, and add calcium carbonate to adjust the pH to 6-6.5, and obtain the base liquid after uniform stirring at normal temperature.

Step 4: Add the thickener and solvent into the base liquid at a ratio of 0.05-0.3:1-2, stir to dissolve, add lactic acid, adjust the pH of the system to 4-5, stir and mix for 4-5 hours, and then add a crosslinking agent.

Step 5: Mix the base liquid and the crosslinking agent, stir and mix at 20-25° C. for 30-40 minutes, discharge and cool to obtain organogel.

Step 6: Mix the above-mentioned organogel with the remaining raw materials, heat and stir for 1-2 hours at room temperature 20-25° C., continue add the remaining raw materials and stir for 30-40 minutes, cool in a water tank, dehydrate, and vacuum-dry to obtain the product.

The equipment used for mixing and stirring the polymer adhesive is a disperser, the rotating speed range of the disperser is 500-1500 rpm, and the temperature range during stirring is 10-30° C.

More specifically: 25-30 parts of epoxy resin, 15-20 parts of phenolic resin, 11-13 parts of polyolefin resin, 6-10 parts of urea-formaldehyde resin and 20-30 parts of water are mixed and stirred, and add anti-aging agent after stirring evenly, sir at 20-30° C. for 20-30 minutes, mix 9-15 parts of polyvinyl acetate, 5-8 parts of sodium alginate and 3-5 parts of acrylate stearate into 10-20 times water, stir and add 4-6 parts of the remaining rosin glue under the condition, mix the raw materials after the above treatment, add auxiliary materials and curing accelerator, heat to room temperature under stirring condition, and add calcium carbonate to adjust the pH to 6-6.5, and stir evenly at room temperature, so that the base liquid is obtained.

Add the thickener and the solvent to the base liquid at a ratio of 0.05-0.3:1-2, stir to dissolve, add lactic acid, adjust the pH value of the system to 4-5, stir and mix for 4-5 hours to obtain a cross-linking agent, Mix the base liquid with the crosslinking agent, stir and mix at 20-25° C. for 30-40 minutes, discharge and cool to obtain an organic gel, mix the above-mentioned organic gel with the remaining raw materials, heat and stir for 1-2 hours, continue add the remaining raw materials and stir for 30-40 minutes. The equipment used when mixing and stirring the polymer adhesive is a disperser, and the speed range of the disperser is 500-1500 rpm. The temperature range during stirring is 10-30° C., the mixture is cooled in a water tank, dehydrated, and vacuum-dried to obtain the product.

Figure 6A:
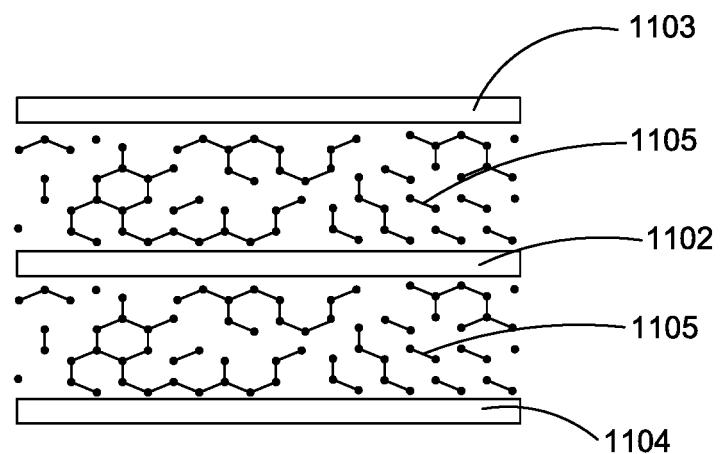
FIG. 6A is a sectional view illustrating a process of manufacturing the intelligent positioning tag by a polymer adhesive according to the above preferred embodiment of the present invention.
Figure 6B:
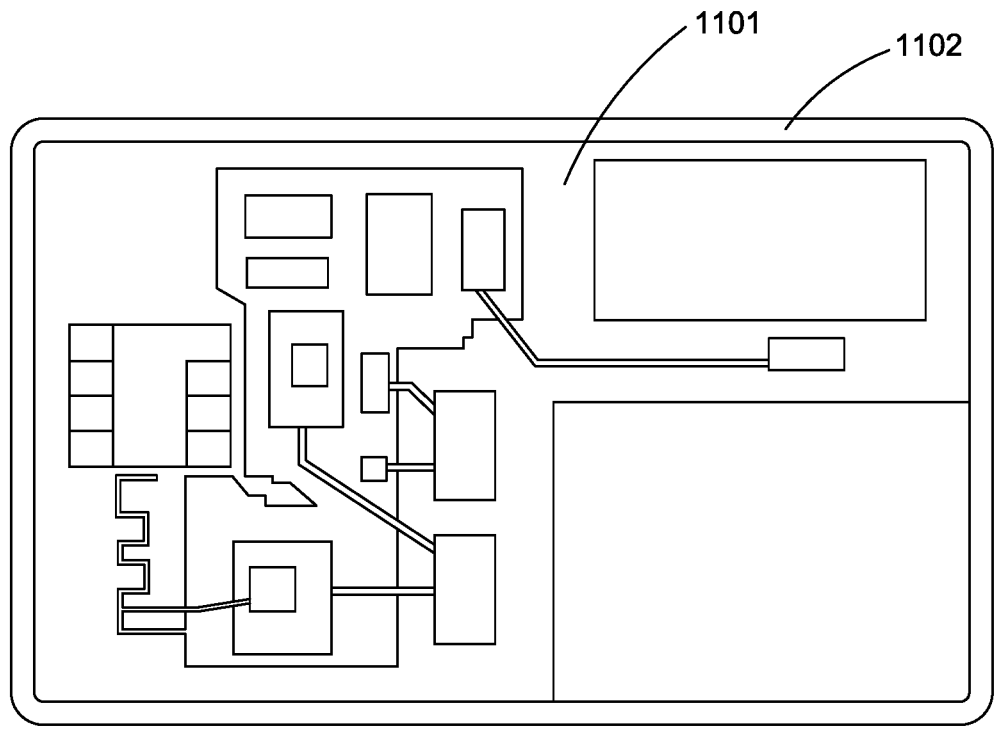
FIG. 6B is a perspective view of a middle frame with the PCB board of the intelligent positioning tag according to the above preferred embodiment of the present invention.
Figure 6C:
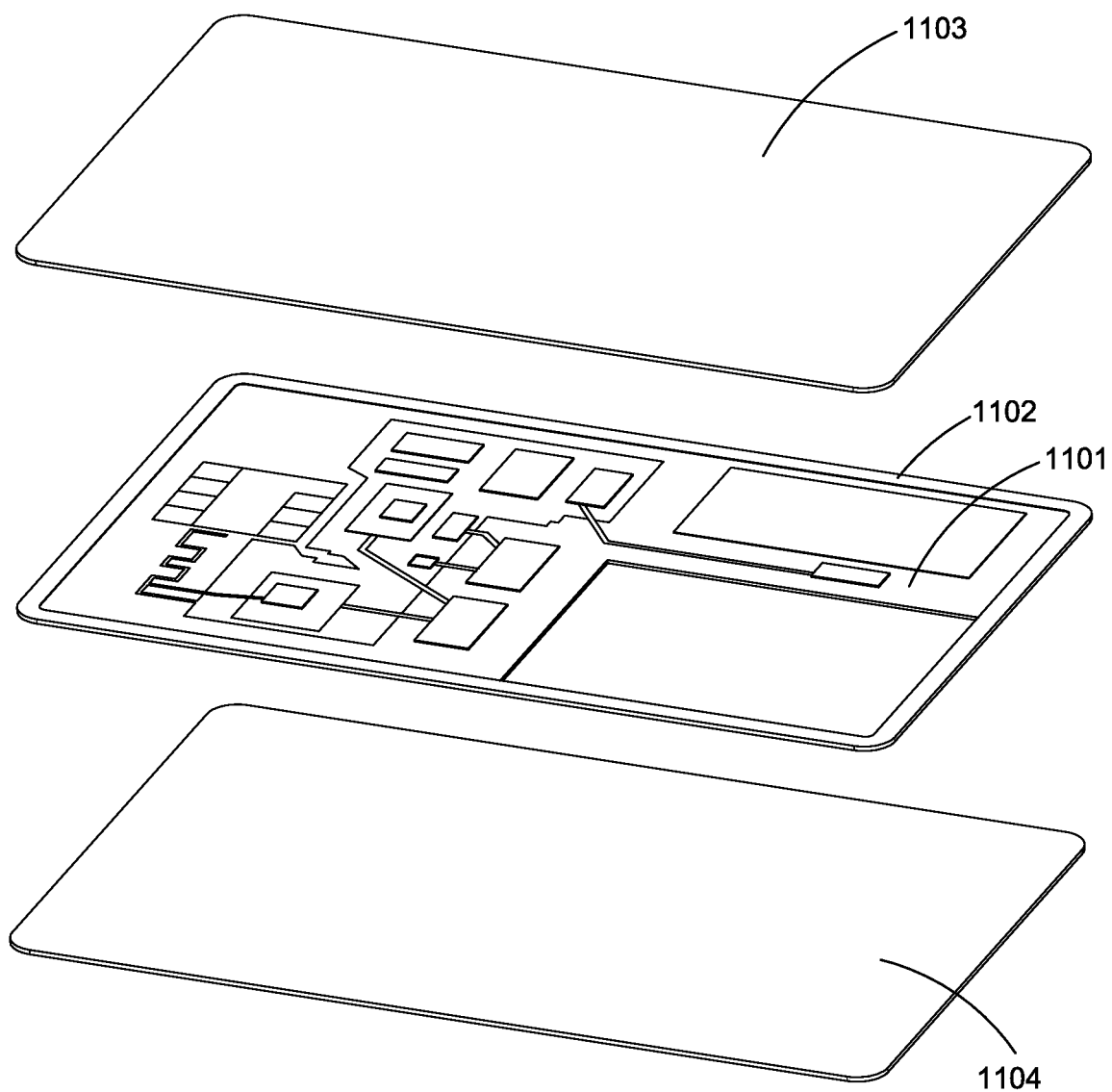
FIG. 6C is a perspective view of outer covers of the intelligent positioning tag according to the above preferred embodiment of the present invention.

As shown in FIGS. 6A to 6B, when manufacturing the intelligent positioning tag 100 by the above mentioned polymer adhesive 1105, a PCB board assembly 1101 is mounted to a middle frame 1102, a top cover 1103 and a bottom cover 1104 is stacked on two opposite sides of the middle frame 1102, and then the polymer adhesive 1105 is applied between the top cover 103 and the middle frame 1102, as well as between the bottom cover 1104 and the middle frame 1102. A pressing equipment applies a pressing force on the card body 110 comprising the stacked bottom cover 1104, PCB board assembly 1101, middle frame 1102 and the top cover 1103 with a predetermined pressure such as 10Mpba, so that the polymer adhesive 105 evenly adhere the components of the card body 110, wherein the peel force of the components of the card body 110 is in the range of 5-15N, so that the prepared product is waterproof, the structural strength is enhanced, the service life of the product is prolonged, and the thermal expansion rate under the condition of the vibration of the product is reduced. As mentioned above, the polymer adhesive 1105 used for adhering the components of the PCB board assembly 1101 and for adhering the top cover 1103 and the bottom cover 1104 with the middle frame 1102 and the PCB board 1101 can increase the viscosity of the adhesive as well as provide a balanced fluidity.

Referring FIGS. 7 to 18, the present invention provides a digital currency payment visual card 200 with a positioning function. The digital currency payment visual card 200 with a positioning function comprises a card body 210, a display module 220 provided on on the card body 210, a controller 230 and a positioning module 240. The controller 230 is communicated with the display module 220 and the positioning module 240, and the controller 230 is used to receive the transaction request information transmitted by the external device to complete the transaction payment, and output the transaction information to the display module 220 for display. The positioning module 240 is used to generate location information, and the location information is sent to the external device. Accordingly, the digital currency payment visual card 200 of this embodiment is the above intelligent positioning tag 100 with the digital currency payment function.

In this way, the transaction request information transmitted from the external device is received by the controller 230 to complete the transaction payment, and the transaction information is sent to the display module 220 for display, which is convenient for the user to intuitively view the transaction data. Simultaneously, the positioning module 240 generates location information and sends the location information to the external device for achieving positioning.

Figure 9:
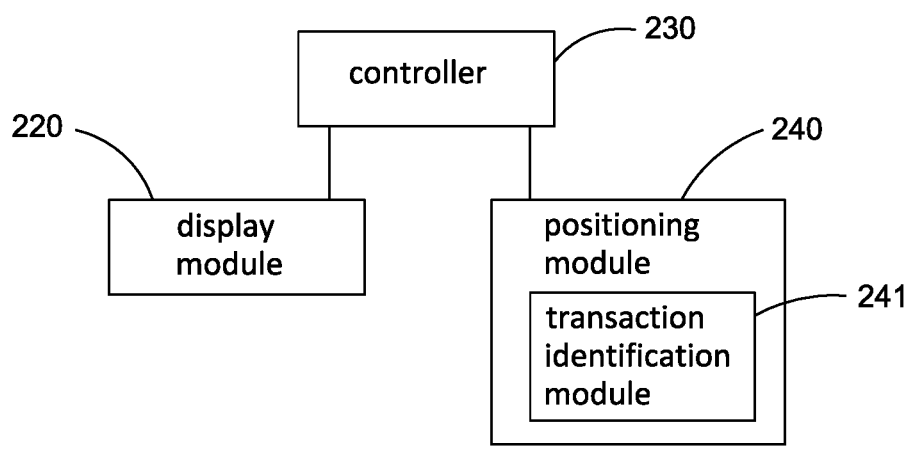
FIG. 9 is a diagram showing another structure of the digital currency payment visual card with positioning function of FIG. 1.

In some embodiments, please refer to FIG. 9, the positioning module 240 comprises transaction recognition module 241 which is connected and communicated with the controller 230 and is used for obtaining transaction user information when the controller 230 is carrying out transaction and generating the location information related to the transaction user information.

It can be understood that the transaction user information comprises the merchant information of the counterparty of the transaction, such as the location information of the store which can be disclosed for positioning. When the user uses the digital currency payment visual card 200 with positioning function to make a payment, after the transaction identification module 241 obtains the transaction user information, it obtains the location of the current payment location according to the obtained transaction user information and sends the location information to the external devices such as an intelligent terminal held by the owner of the digital currency payment visual card 200 with positioning function, and the networked system of the bank and public security, so as to help the user for locating and looking for the lost card.

The positioning module 240 also can be provided with at least one of Bluetooth module, WiFi module or NFC (near field communication) module for wireless communication and sending location information. Accordingly, the positioning module 240 may comprise Bluetooth module, WiFi module, or NFC module. Alternatively, the positioning module 240 may comprise Bluetooth module and WiFi module, Bluetooth module and NFC module, WiFi module and NFC module, or may comprise Bluetooth module, WiFi module and an NFC module.

The location information generated by the positioning module 240 can be set to be automatically generated and sent at an interval preset time, or can be set to be generated after receiving the positioning request information sent by the user, and the user can flexibly set according to actual needs, so as to maximize and guarantee the safe use of the digital currency payment visual card 200 with positioning function.

Figure 10:
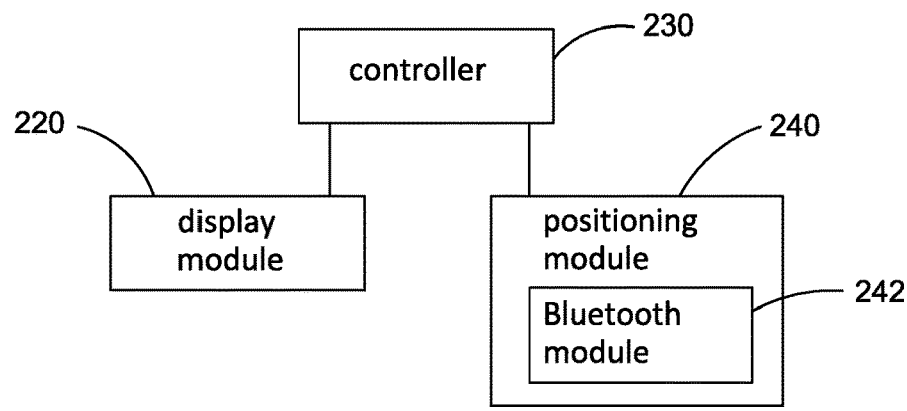
FIG. 10 is diagram showing another structure of the digital currency payment visual card with positioning function of FIG. 1.

In some embodiments, please refer to FIG. 10, the positioning module 240 comprises Bluetooth module 242 which is used to generate the position information when it is recognized that it is in a preset payment area.

When a person holds the digital currency payment visual card 200 with positioning function to pay in the preset payment area, the Bluetooth module 242 will receive the signal and generate position information in the preset payment area, and send it to default receiving device in the area, and also send it to the smart terminal held by the owner of the digital currency payment visual card 200 with positioning function, or network system of the electric terminal, the bank and the public security, so as to help the user to locate and find the lost card.

Figure 7:
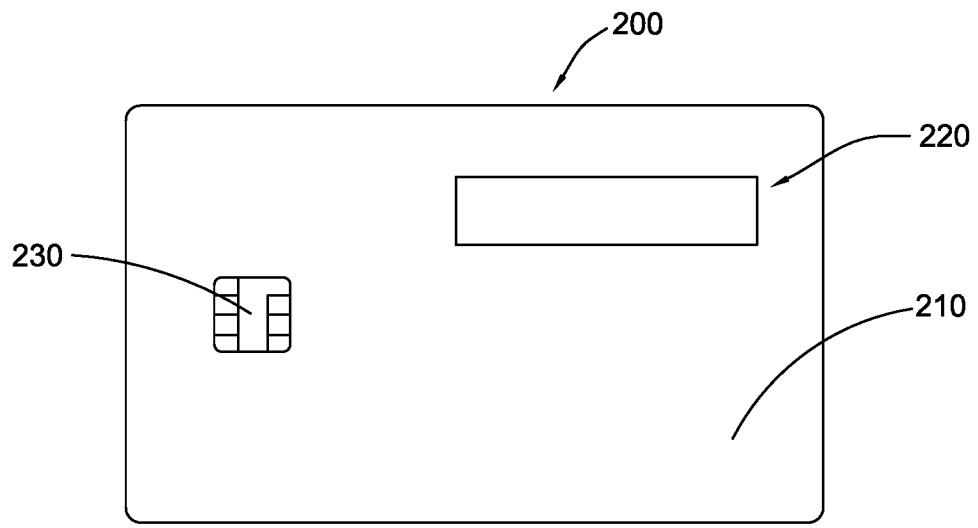
FIG. 7 is a schematic view of a digital currency payment visual card with positioning function according to a preferred embodiment of the present application.
Figure 8:
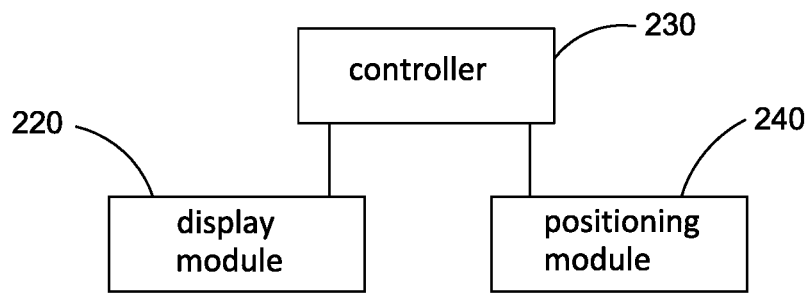
FIG. 8 is a diagram showing a structure of the digital currency payment visual card with positioning function of FIG. 1.

In some embodiments, referring to FIG. 7, the display module 220 comprises a display 221 for displaying the transaction information. The display 221 comprises at least one of a liquid crystal display and an electronic ink screen. The display 221 is embedded in the card body 210, and a display interface of the display 221 is exposed on the outer surface of the card body 210. Specifically, the display interface of the display 221 can be set to be coplanar with the outer surface of the card body 210, or slightly lower than the outer surface of the card body 210.

Figure 11:
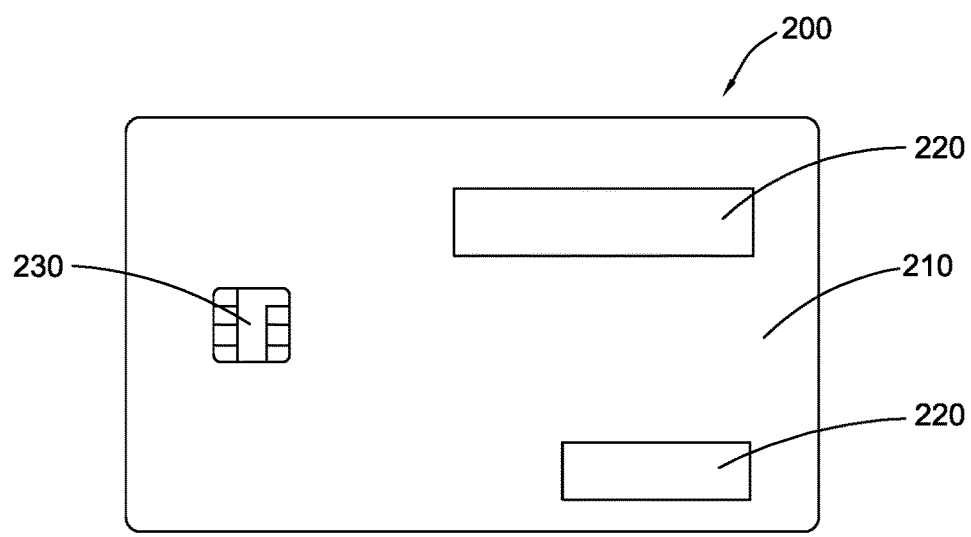
FIG. 11 is a schematic view of the digital currency payment visual card with positioning function according to an alternative mode of the above preferred embodiment of the present invention.

It can be understood that, referring to FIG. 11, a plurality of displays 221 can be arranged on the surface of the card body 210 to display different information respectively, the information can be transaction money data, transaction time data and transaction location data, and the transaction location data can be acquired from the positioning module 240, it is convenient for the user to fully acknowledge the current transaction. The display 221 also can display the status information of the card itself such as the current remaining power.

Figure 12:
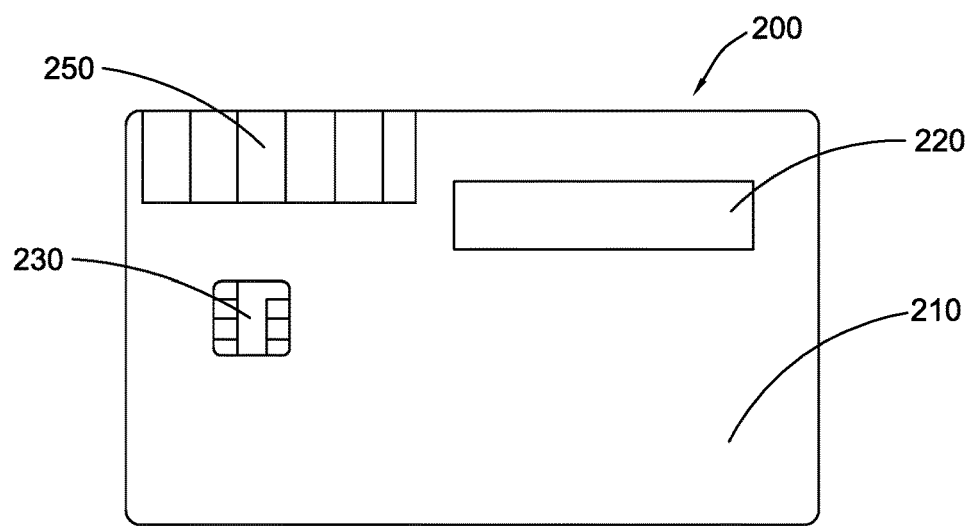
FIG. 12 is a schematic view of the digital currency payment visual card with positioning function according to another alternative mode of the above preferred embodiment of the present invention.

In some embodiments, referring to FIG. 12, the digital currency payment visual card 200 with positioning function also comprises a solar charging board 250, which is located on the surface of the card body 210, and the solar charging board 250 is electrically connected to the display module 220, the controller 230 and the positioning module 240 for power supply. The card body 210 can be provided with multiple solar charging board 250, in order to realize a longer batter life of the digital currency payment visual card 200 with positioning function, so as to ensure that the digital currency payment visual card 200 with the positioning function can be used for a relatively long time period.

The solar charging board 250 is embedded in the card body 210, and an upper surface thereof is exposed on the outer surface of the card body 210. Specifically, the upper surface of the solar charging board 250 can be be coplanar with the outer surface of the card body 210, or slightly lower than the outer surface of the card body 210.

Figure 13:
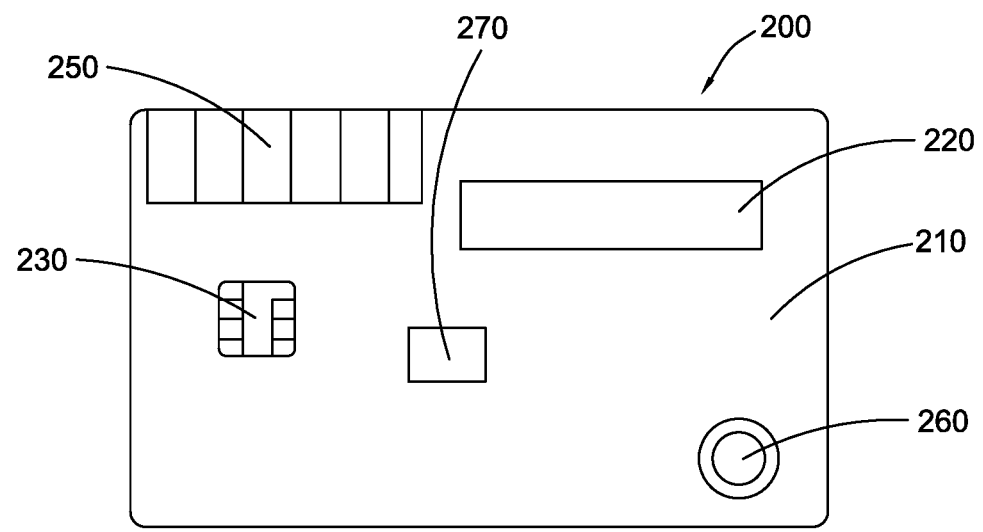
FIG. 13 is a schematic view of the digital currency payment visual card with positioning function according to another alternative mode of the above preferred embodiment of the present invention.

In some embodiments, please refer to FIG. 13, the digital currency payment visual card 200 with positioning function also comprises a button 260 that is located on the card body 210, and the button 260 is used to control the on and off of the controller 230 and can be a push button or a toggle switch.

The digital currency payment visual card 200 with positioning function can be set to automatically pay by swiping the card, or can be set to activate the payment by operating the button 260. When the digital currency payment visual card 200 with positioning function is set with the button 260 to control the activation of the payment, when the user needs to pay, the user needs to operate the button 260 to start the payment function of the digital currency payment visual card 200 with the positioning function and make payment. After successful completion of the payment, the digital currency payment visual card 200 with positioning function can be set to automatically close the payment function, delay a preset time period before closing the payment function, or close the payment function by operating the button 260 again, so as to achieve the close of the payment function.

The button 260 can also be used for controlling the opening and closing of the display 221, when not needing to use the digital currency payment visual card 200 with positioning function, the display 221 can be turned off by operating the button 260 to save electricity, so as to prolong its service life. When the display 221 is controlled to be turned off by the button 260, all information is not displayed on the display 221, or it can also be set to display only a small amount of information, such as time information.

Referring to FIG. 13 of the drawings, the digital currency payment visual card 200 with positioning function further comprises a signal blocking module 270, when the digital currency payment visual card 200 is not used for payment, the signal blocking module 270 is in operation so as to prevent data stored in the digital currency payment visual card 200 from being stolen by other electrical devices which establishes wireless connection with the digital currency payment visual card 200. When the digital currency payment visual card 200 is activated during payment, such as swiping the digital currency payment visual card 200, the controller 230 turned off the operation of the signal blocking module 270 and activate the positioning module 240 so as to obtain the location information and the controller 230 sends the location information to the smart terminal held by the owner of the digital currency payment visual card 200 with positioning function, or network system of the electric terminal, the bank and the public security, so as to help the user to locate and find the lost card.

In other words, when the signal blocking module 270 is in operation, signal of the positioning module 240 is also blocked and cannot work. When the digital currency payment visual card 200 with positioning function is detected that it is used for payment, such as by determining the swiping movement of the digital currency payment visual card 200 by the above mentioned acceleration sensor 117 or a gyroscope sensor, the positioning module 240 is automatically activated by the controller 230.

Figure 14:
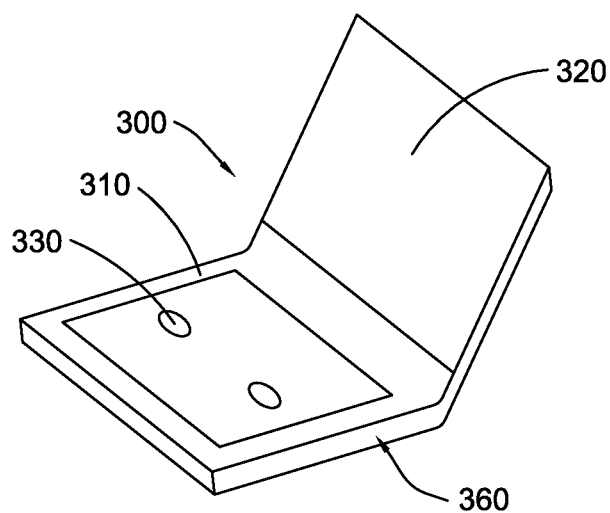
FIG. 14 is a perspective view of a charging wallet for the digital currency payment visual card with positioning function according to the above preferred embodiment of the present invention.
Figure 15:
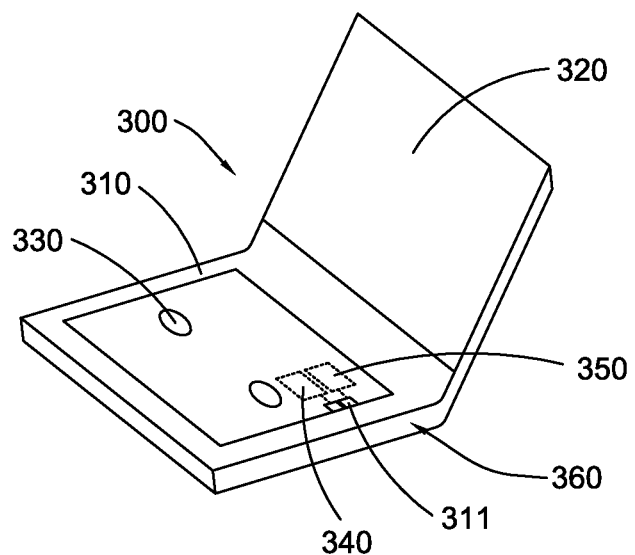
FIG. 15 is a schematic view of the charging wallet for the digital currency payment visual card with positioning function according to an alternative mode of the above preferred embodiment of the present invention.
Figure 16:
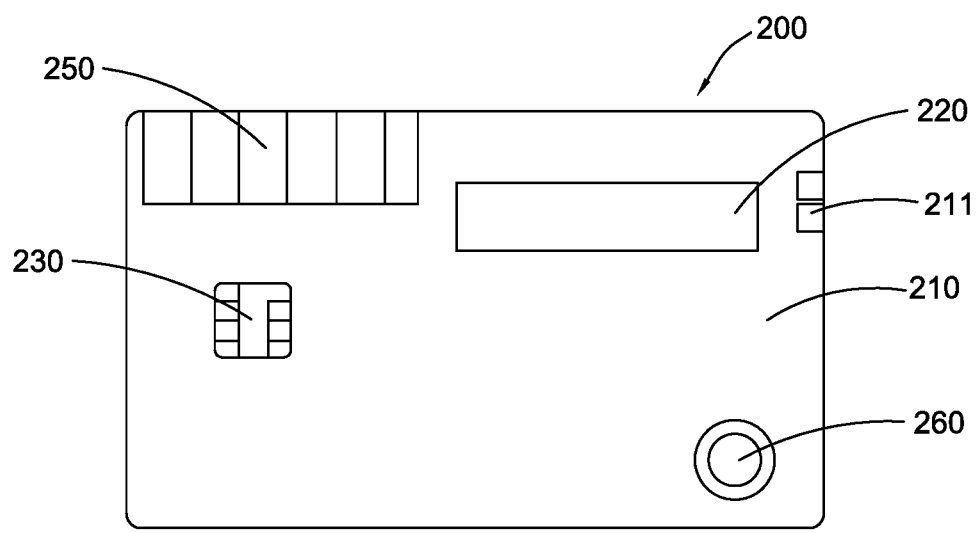
FIG. 16 is a schematic view of the digital currency payment visual card with positioning function that is matched with the charging wallet in FIG. 15.

Please refer to FIG. 14, the present invention also provides a digital currency payment visual card system comprising the above-mentioned digital currency payment visual card 200 with positioning function, and a charging assembly which is a charging wallet 300 comprising a first part 310 and a second part 320, the first part 310 and the second part 320 can be relatively foldable to be close to or away from each other. The first part 310 or the second part 320 is provided with a power supply component 340. When the first part 310 is folded, a magnetic attracting element 330 is provided on a surface facing the second part 320, and the magnetic attracting element 330 is used to attract the card body 210 between the first part 310 and the second part 320, and the power supply component 340 can be used to charge the digital currency payment visual card 200 with positioning function.

In this way, the card body 210 is sandwiched between the foldable first part 310 and the second part 320 of the charging wallet 300 through the magnetic attracting element 330, which is convenient for access, and at the same time avoids placing the card body 210 with a certain thickness in an inter layer of the charging wallet 300 to result in deformation of the charging wallet 300. The digital currency payment visual card 100 with positioning function is charged by the power supply component 340 when the card body 210 is placed in the charging wallet 300, so that the service life of the digital currency payment visual card 200 with positioning function is increased.

When the charging wallet 300 is in use, the charging wallet 300 can be opened and closed by folding the first part 310 and the second part 320. Each of the first part 310 and the second part 320 can be provided with a pocket 360, and the pocket 360 inside the first part 310 and the pocket 360 inside the second part 320 may be arranged to communicate with each other or be separated from each other. The magnetic attracting element 330 can be a magnet sheet that is fixed on the surface facing the second part 320 when the first part 310 is folded, so as to attract the card body 210. The user can place the card body 210 in such a manner that the card body 210 is attracted to the magnetic attracting element 330, and when the first part 310 and the second part 320 are folded, a certain pressure will be generated between the first part 310 and the second part 320, so as to further fix and retain the card body 210 between the first part 310 and the second part 320. When the user needs to take out the digital currency payment visual card 200 with positioning function for payment, he or she only need to flip over the first part 310 and the second part 320 and remove the card body 210 from the magnetic attracting element 330, so that the operation is convenient and fast.

The power supply component 340 can be an ultra-thin solid-state lithium battery, and the ultra-thin solid-state lithium battery is arranged in the pocket 360 of the first part 310, and when the card body 210 is attracted between the first part 310 and the second part 320, the ultra-thin solid-state lithium battery is electrically connected to the card body 210 to charge the digital currency payment visual card 200 with positioning function. The ultra-thin solid lithium battery can be detachably arranged in the pocket 360 of the first part 310, which is convenient for the user to replace.

In some embodiments, the charging wallet 300 may comprise an electrostatic conversion device 350 for converting static electricity into charging electricity for the digital currency payment visual card 200 with positioning function. When the charging wallet 300 is placed in the user's pocket or backpack, the electrostatic conversion device 350 can absorb the static electricity of the human body. On the one hand, the energy is clean and continuous. On the other hand, it can also reduce the static electricity of the human body and improve the comfort of the human body. In addition, existing electrostatic conversion device may require a grinding disc to rotate to generate static electricity, and the grinding disc is large in size and movable, so that it is not suitable for carrying out. But the electrostatic conversion device 350 of the present invention can remove the grinding disc and directly absorb the static electricity generated by the human body (it can be considered that the human body replaces the existing electrostatic grinding disc). The outer surface of the wallet can be provided with metal contacts electrically connected to the electrostatic conversion device, and the metal contacts and the body clothes are in contact to absorb static electricity, and the static electricity generated by the human body is collected and converted into static electricity that can be used for charging the digital currency payment visual card 200 with positioning function through the electrostatic conversion device 350. Please refer to FIG. 15 to FIG. 16, the first part 310 is provided with two first connectors 311 on a surface thereof, the card body 210 is provided with two second connectors 211, and the first connectors 311 are electrically connected to the electrostatic conversion device 350, so that when the card body 210 is attracted by the magnetic member 330 between the first part 310 and the second part 320, the first connectors 311 are respectively electrically connected to the second connectors 211, so that the electrostatic conversion device can charge the digital currency payment visual card 200 with positioning function.

Figure 17:
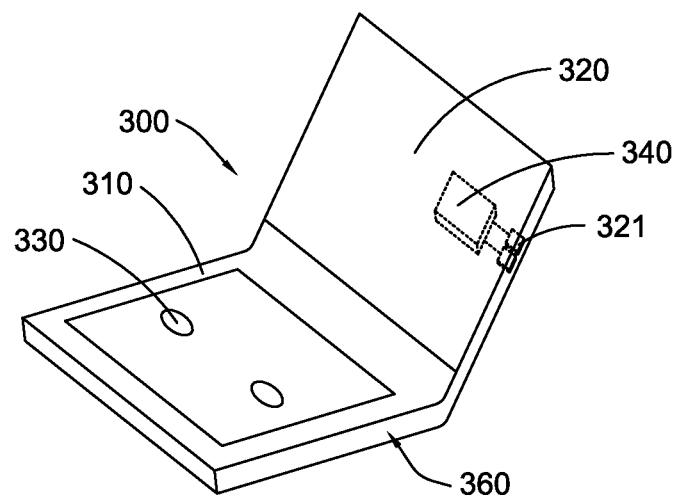
FIG. 17 is a schematic view of the charging wallet for the digital currency payment visual card with positioning function according to another alternative mode of the above preferred embodiment of the present invention.
Figure 18:
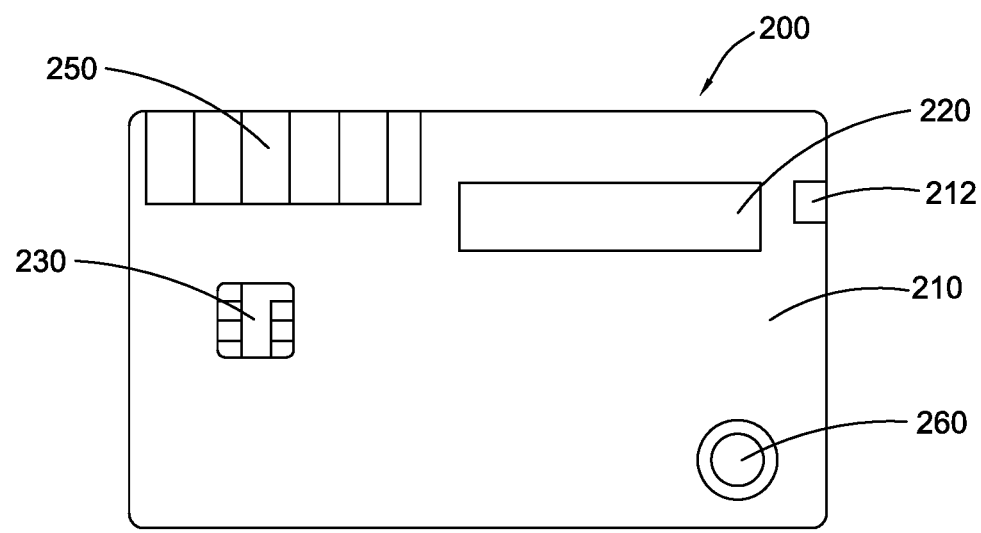
FIG. 18 is a schematic view of the digital currency payment visual card with positioning function that is matched with the charging wallet in FIG. 17.
Figure 19:
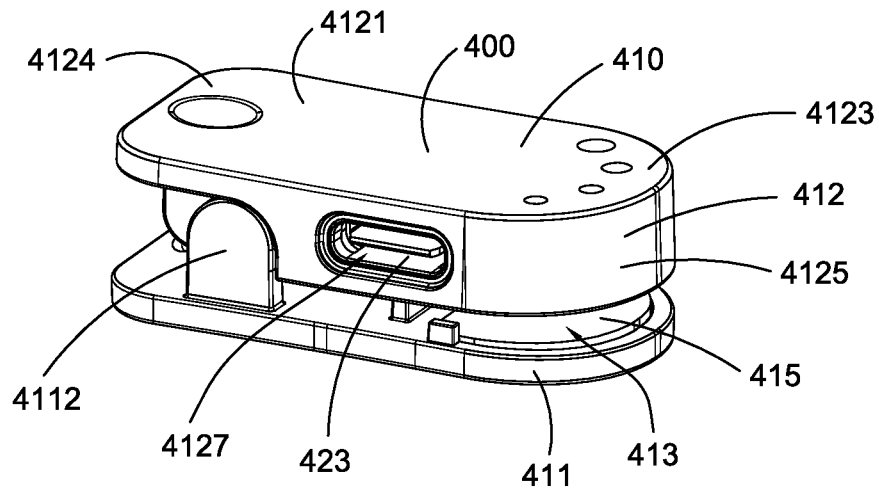
FIG. 19 is a perspective view of a charging clamp for the digital currency payment visual card with positioning function according to a preferred embodiment of the present invention.
Figure 20:
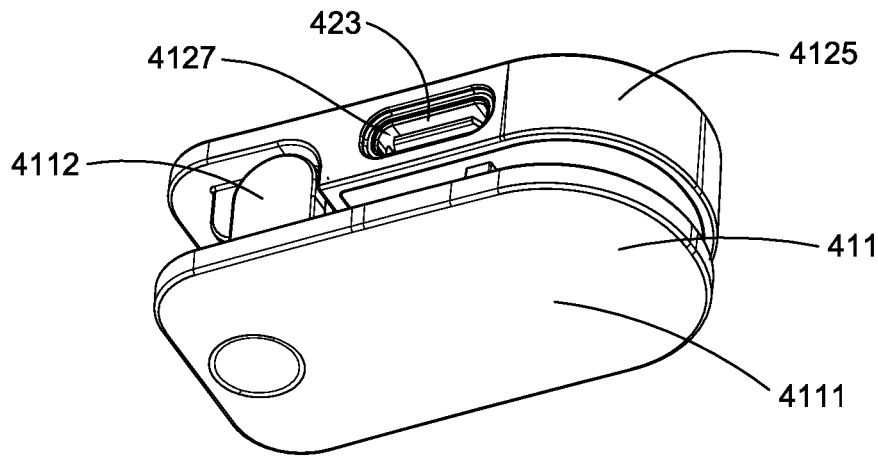
FIG. 20 is another perspective view of the charging clamp for the digital currency payment visual card with positioning function according to the above preferred embodiment of the present invention.
Figure 21:
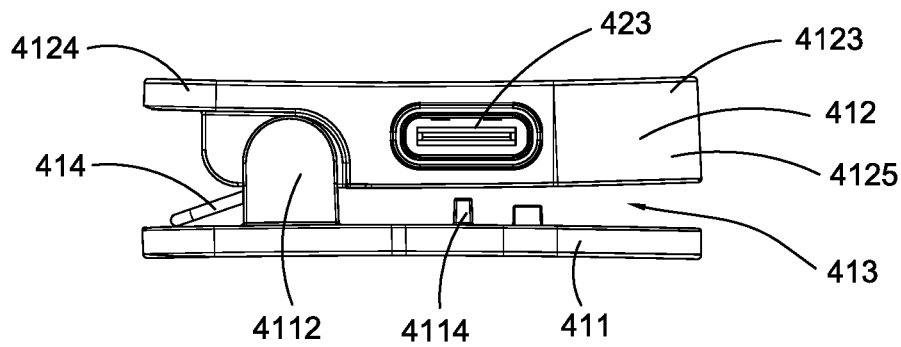
FIG. 21 is a side view of the charging clamp for the digital currency payment visual card with positioning function according to the above preferred embodiment of the present invention.
Figure 22:
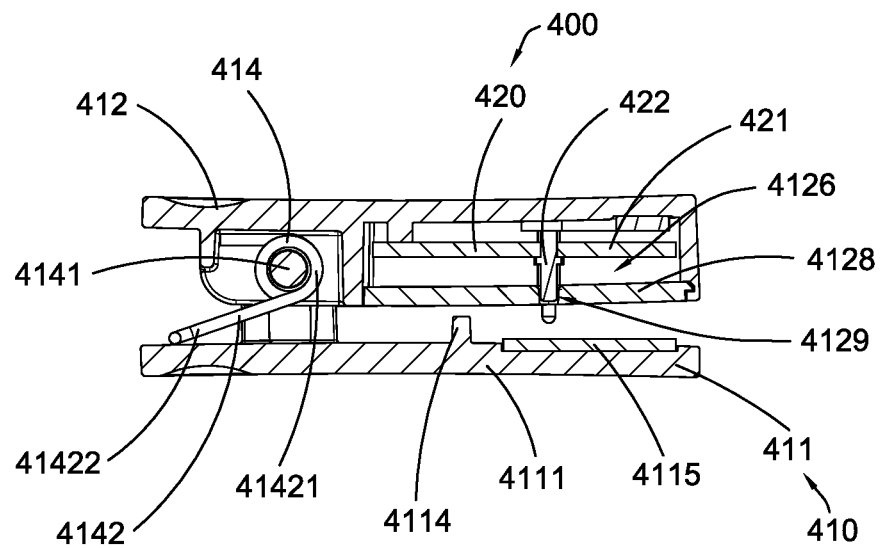
FIG. 22 is a sectional view of the charging clamp for the digital currency payment visual card with positioning function according to the above preferred embodiment of the present invention.
Figure 23:
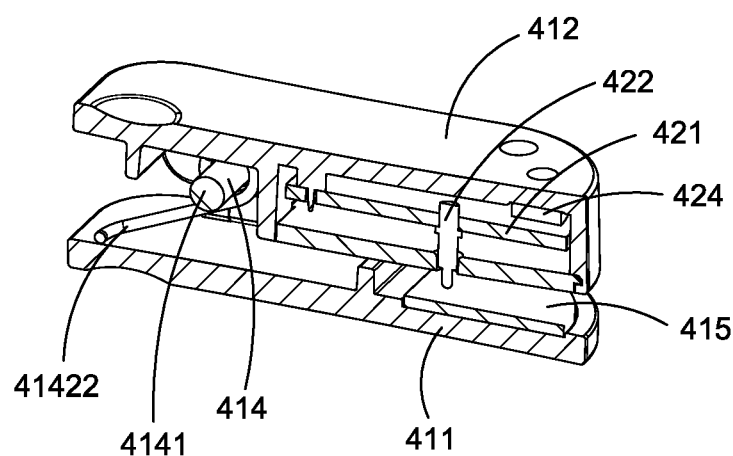
FIG. 23 is a schematic view illustrating a charging unit of the charging clamp for the digital currency payment visual card with positioning function according to the above preferred embodiment of the present invention.
Figure 24:
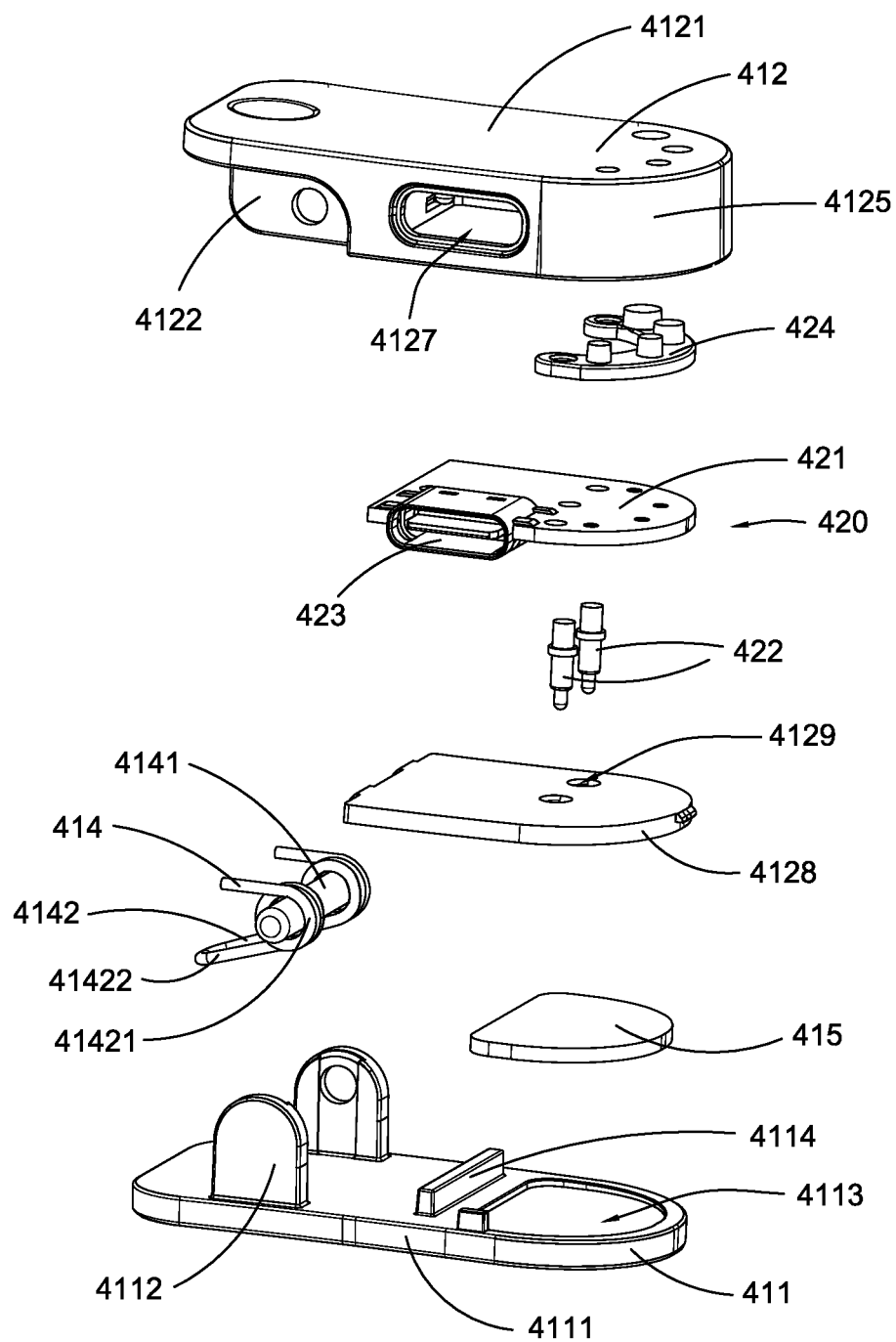
FIG. 24 is an exploded view of the charging clamp for the digital currency payment visual card with positioning function according to the above preferred embodiment of the present invention.
Figure 25:
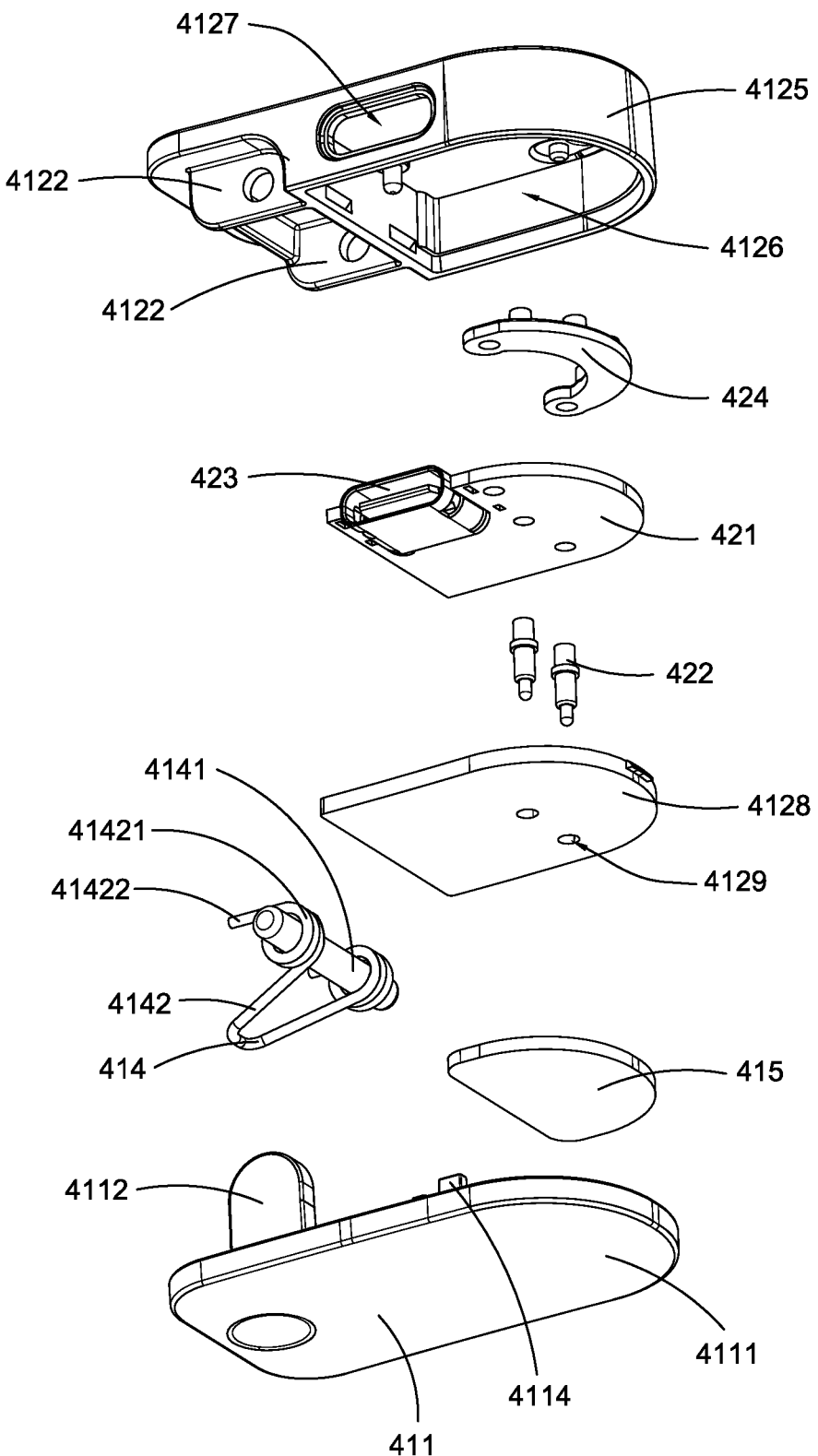
FIG. 25 is another exploded view of the charging clamp for the digital currency payment visual card with positioning function according to the above preferred embodiment of the present invention.
Figure 26:
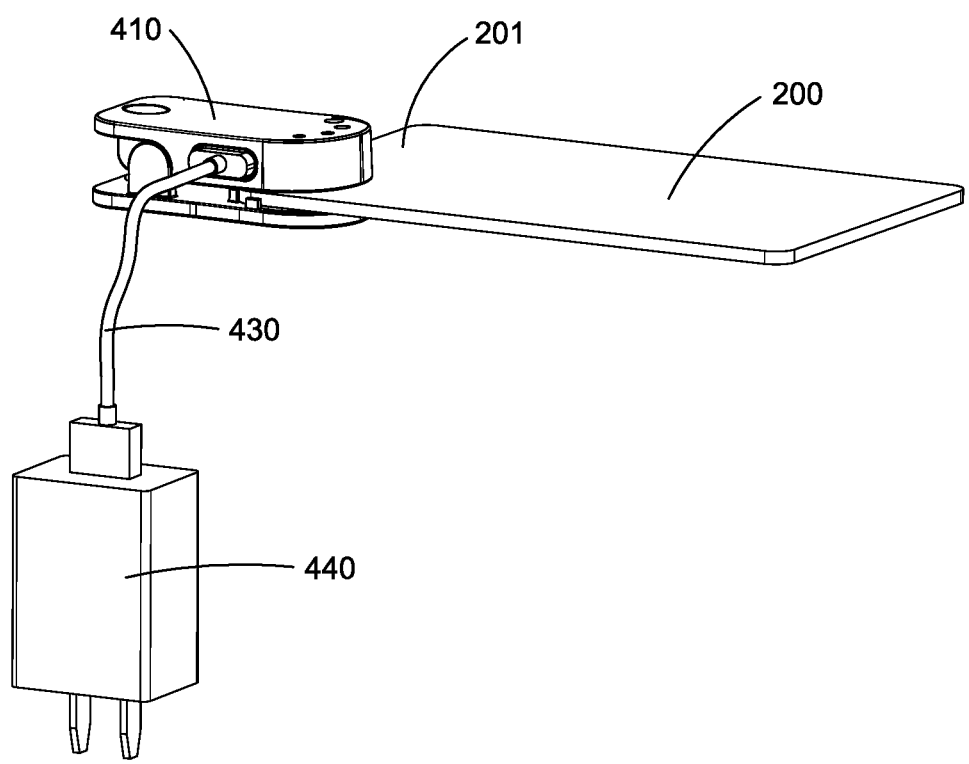
FIG. 26 is a perspective view illustrating the charging clamp being in a state for charging the digital currency payment visual card with positioning function according to the above preferred embodiment of the present invention.
Figure 27:
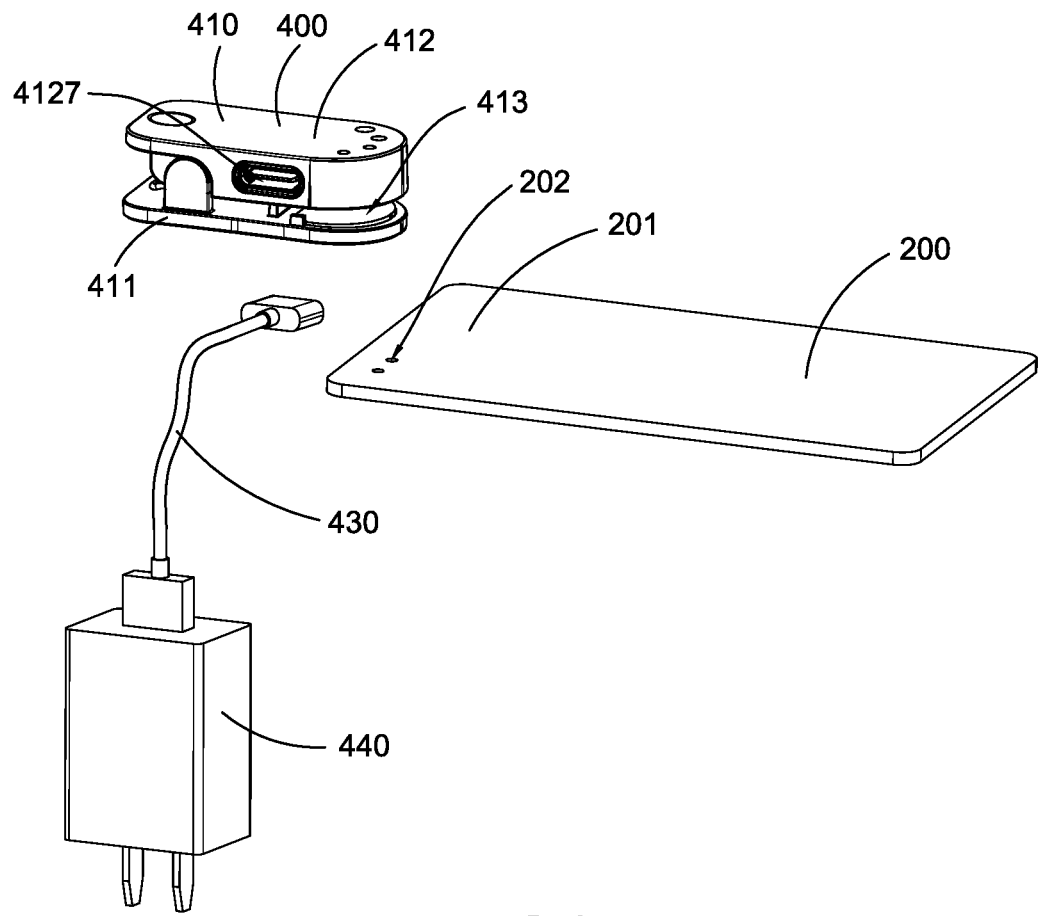
FIG. 27 is a schematic view illustrating the charging clamp with an electrical connector plug being disconnected according to the above preferred embodiment of the present invention.
Figure 28:
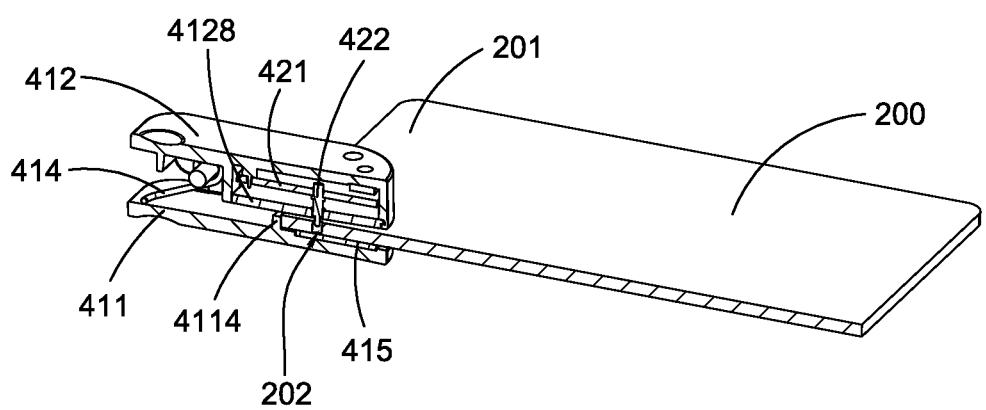
FIG. 28 is a sectional view illustrating the charging clamp being in a state for charging the digital currency payment visual card with positioning function according to the above preferred embodiment of the present invention.

In some embodiments, referring to FIGS. 17 and 18 of the drawings, the power supply component 340 is arranged in the second part 320, and the surface of the second part 320 facing the first part 310 after being folded is provided with first charging contacts 321, and the charging wallet 300 is configured as when the first part 310 and the second part 320 are folded into a stacked arrangement, the first charging contacts 321 are magnetically attracted to the second charging contacts 212 on the card body 210 to charge the card. The charging wallet 300 is also configured in such a manner that when the first part 310 and the second part 320 are opened, the first charging contacts 321 are separated from the corresponding second charging contacts 212, and the card body 210 obtains the position information of the current position and the corresponding time information, and transmit the location information and the time information to a terminal device.

It is found that when the user uses paper money to pay for the transaction and subsequently doubts about the transaction, it is difficult to trace back to the merchant who has carried out the transaction through memory. For example, a user finishes buying an item at a store and pays for the excess paper money, a few days later, it is found that the remaining cash in hand was wrong, but here are too many merchants who have traded in a few days, and he or she can't remember which merchants he or she have traded in, or he or she have been to unfamiliar place in the past few days and has made a transaction but cannot find the corresponding merchant, it is impossible to trace back the event that the transaction amount was wrong a few days ago. In other words, the accuracy of track of transactions in the prior art is poor. In this embodiment, the card body 210 can be charged when the charging wallet 300 is closed, and when the charging wallet is opened, the card cannot be charged because the first charging contacts 321 are separated from the second charging contacts 212. Also, the inventors have found that the only when it is opened (when the first part 310 and the second part 320 are opened), there will be the transaction (in most cases be a money transaction). And the transaction is not necessarily with a payment card, it may be with cash, and its location information cannot be obtained when the payment is made by cash, so in this embodiment, as long as the charging wallet 300 is opened, the card body 210 will obtain the location information of the current location and the corresponding time information, and send the location information and time information are transmitted to a terminal such as a mobile phone for storage. In this way, if the user finds that the transaction amount is doubtful later or in other cases, even if cash payment is used, it can be traced through location information and time information, so as to check with stores that have previously made the trade. Due to the digital cash register method adopted by existing merchants, when selling goods and receiving cash, there is a strong corresponding relationship between them. When the transaction amount of banknotes is wrong, the merchant will check it later (usually at the end of the day, and the above-mentioned problems can be found in the process of counting but even if the merchant charges more money, it cannot be returned to the consumer. When using this method of the present invention, when the user traces back to the merchant, the honest merchant will deal with it immediately, and the dishonest merchant can also processed by requiring inspection monitoring.

In a further embodiment, the digital payment card is also configured to be able to acquire the state of the magnetic attracting element 330 and the card body 210, and when the magnetic attracting element 330 and the card body 210 is switched from an attraction state to a separation state, adjust the transaction state of the digital currency payment visual card 200 to a state that it is about to ready to pay the transaction, and obtain the digital payment value of money in the card, the value will be acquired again after the magnetic attracting element 330 and the card body 210 are engaged next time. When the two values of the money in the digital payment currency visual card 200 are found to be the same, the current location information and time information are obtained and marked with a third identification information, and the location information and time information with the third identification information are uploaded to the terminal device for storage.

In this embodiment, it is judged whether a payment card transaction has been made through the change of the values, which has a higher reliability. In particular, according to this example, in the process, by judging whether the charging wallet 300 is opened or whether the digital payment currency visual card 200 is taken out from the charging wallet 300, a signal is generated, so that the digital payment currency visual card 200 can only be enabled after obtaining this signal, so as to save energy. The conventional payment card cannot judge whether the user is about to make a payment transaction, so the internal circuit needs to be always in the standby state in real time to facilitate quick response during the payment transaction (In the off state, it can also be initiated through the merchant's payment device, but the response speed is slow). However, when the digital payment currency visual card 200 of the present invention is in use, when the card it is attracted on the charging wallet 300, it can be turned off, and when the payment card is taken out, the information that the payment transaction is about to be implemented is obtained, so that is enters the standby state immediately, which can reduce the power consumption of the payment card and increase the service life of the payment card.

Furthermore, the digital payment currency visual card 200 of the present invention may comprise a light-emitting display screen, such as an LED display screen or an OLED display screen. And the digital payment currency visual card 20 is configured in such a manner that the screen is turned on when the transaction state of the digital payment card (specifically, the magnetic attracting element 330 is separated from the card body 210) is on when the transaction is about to be paid, and the screen is turned off after the card body 21 is attracted to magnetic attracting element 330. In this way, the display screen does not need to be lighted up too much, so that it can also be more practical for dark light conditions at night (ink screens are difficult to use at night, and existing conventional digital payment cards mostly use ink screens because of the low battery problem).

Referring to FIGS. 19 to 28 of the drawings, a charging assembly which is a charging clamp 400 for the digital payment currency visual card 200 or the intelligent positioning tag 100 is illustrated, the charging clamp 400 comprises a clamp body 410, and a charging unit 420 assembled to the clamp body 410 for charging the digital payment currency visual card 200 or the intelligent positioning tag 100. The following description will illustrate the electrically charging of the digital payment currency visual card 200 as an illustrative example.

More specifically, the clamp body 410 comprises a base board 411 and a movable clip 412 for defining a clamping slot 413 therebetween for receiving a charging end portion 201 of the digital payment currency visual card 200.

The clamp body 410 comprises a resetting mechanism 414 that is coupled to the base board 411 and the movable clip 412 is such a manner that the resetting mechanism 414 allows the movable clip 412 to be moved with respect to the base board 411, the charging end portion 201 of the digital payment currency visual card 200 can be retained in the clamping slot 413 and sandwiched between the base board 411 and the movable clip 412, so that the charging unit 420 is electrically connected to the digital payment currency visual card 200 for charging the digital payment currency visual card 200 or the intelligent positioning tag 100. When the charging end portion 201 of the digital payment currency visual card 200 is removed from the clamping slot 413, the resetting mechanism 414 restore the relative position of the base board 411 and the movable clip 412.

The resetting mechanism 414 can be any elastic restoring structure such as a restoring compression spring. In this embodiment, the resetting mechanism 414 comprises a pivot pin 4141, and one or more torsional springs 4142 mounted on the pivot pin 4141 and sandwiched between the base board 411 and the movable clip 412. Each of the torsional springs 4142 comprises a spring body 41421 and two biasing legs 41422 extended from the spring body 41421 for biasing against the inner surfaces of the base board 411 and the movable clip 412. According to this embodiment, the resetting mechanism 414 comprises two torsional springs 4142 mounted on the pivot pin 4141.

The base board 411 comprises a board body 4111 and two fixing members 4112 extended from the board body 4111 at two sides thereof. The movable clip 412 comprises a clip body 4121 and two retaining members 4122 extended from the clip body 4121 at two sides thereof. Each end of the pivot pin 4141 is connected to one fixing member 4112 and one retaining member 4122 by penetrating through the corresponding fixing member 4112 and the retaining member 4122. Accordingly, two ends of the pivot pin 4141 are respectively connected to two fixing members 4112 and two retaining members at two opposite sides thereof.

According to this preferred embodiment, a distal end portion 4123 of the movable clip 412 is pivotally movable with respect to the base board 411 to allow the charging end portion 201 of the digital payment currency visual card 200 to be inserted into the clamping slot 413 and clipped between the movable clip and the base board 411, so that the charging unit can charge the digital payment currency visual card 200. After the electrical charging of the digital payment currency visual card 200, the user may press a proximate end portion 4124 which is opposite to the distal end portion 4123 of the movable clip 412 to release the charging end portion 201 of the digital payment currency visual card 200 that is retained in the clamping slot, so that the charging end portion 201 of the digital payment currency visual card 200 can be withdrawn from the clamping slot 413. And when the user releases the proximate end portion 4124 of the movable clip 412, the resetting mechanism 414 restores the relative position between the movable clip 412 and the base board 411.

More specifically, when the charging end portion 201 of the digital payment currency visual card 200 is inserted into the clamping slot 413, the biasing legs 41422 are pressed by inner surfaces of the movable clip 412 and the base board 411 to accumulate elastic potential energy, and when the charging end portion 201 of the digital payment currency visual card 200 is removed from the clamping slot 413, the biasing legs 41422 are released, so as to restore the original position of the movable clip 412.

The charging unit 420 comprises a charging circuit 421 which supplies energy from external power supply device to the digital payment currency visual card 200, two charging pins 422 electrically connected to the charging circuit 421, and an electrical connecting interface 423 such as a type-c interface, the charging end portion 201 of the digital payment currency visual card 200 comprises two charging contact areas 202, so that when the charging end portion 201 of the digital payment currency visual card 200 is retained in the clamping slot 413 to align the two charging contact areas 202 with the two charging pins 422 of the charging unit 420, the digital payment currency visual card 200 is charged by the charging circuit 421 of the charging unit 420 when the electrical connecting interface 423 is supplied with electric energy by an external power supply device. More specifically, the charging clamp 400 further comprises an electrical connecting wire 430 that can be electrically connected to the external power supply device. The charging clamp 400 may further comprise an electrical connector plug 440 that can be electrically connected to the electrical connecting wire 430, so that when the electrical connector plug 440 is electrically connected to commercial power supply, the charging unit 420 is supplied with electrical power to charge the digital payment currency visual card 200.

The movable clip 412 comprises an enclosing wall 4125 extended from the board body 4121 to define a receiving cavity 4126 to store the charging unit 420. Accordingly, the movable clip 412 of this embodiment can be embodies as a movable upper casing. Alternatively, the charging unit 420 may be retained at the base board 411. The enclosing wall 4125 has a communicating hole 4127 for accessing the electrical connecting interface 423, so that the charging unit 420 can be electrically connected to the electrical connector plug 440 through the electrical connecting wire 430.

The charging unit 420 further comprises a lighting element 424 electrically connected to the charging circuit 421, the lighting element 424 may comprise one or more lighting members that can be turned on to show differ charging states of the digital payment currency visual card 200, such as using red light illumination for showing a state in which the digital payment currency visual card 200 is successfully electrically connected to the charging circuit 421 and is being charged by the charging circuit 421, using green light illumination for showing a state in which the digital payment currency visual card 200 has finished the charging procedure and the digital payment currency visual card 200 has been fully charged with electrical power. Correspondingly, the top surface of the clip body 4121 of the movable clip 421 is provided with transparent areas or holes for allowing the light from the lighting element 424 to come out of the movable clip 412 and reach the user's eyes.

The movable clip 412 further comprises an assembling plate 4128 for mounting on the enclosing wall 4125 to seal the receiving cavity 4126 and hide the charging circuit 421 in the receiving cavity 4126. The assembling plate 4128 has two penetrating holes 4129 for allowing the two charging pins 422 to penetrate through for aligning with the two charging contact areas 202 of the charging end portion 201 of the digital payment currency visual card 200.

The base board 411 further has an accommodating groove 4113, and the clamp body 410 further comprises a retaining pad 415 that is received and retained in the accommodating groove 4113 for retaining the charging end portion 201 of the digital payment currency visual card 200 in the clamping slot 413 in position and prevent the unwanted sliding movement of the charging end portion 201 of the digital payment currency visual card 200. Accordingly, the retaining pad 415 can be made of an anti-skidding material such as resin, silicon, and rubber.

It is worth mentioning that the charging end portion 201 of the digital payment currency visual card 200 is firmly retained between the assembling plate 4128 and the retaining pad 415, and the assembling plate 4128 is made of an electrically insulating material for separating the charging circuit 421 from the charging end portion 201 of the digital payment currency visual card 200. In addition, the thickness of the assembling plate 4128 is selected and designed to mount the charging circuit 421 in the receiving cavity 4126 and retaining the electrical connecting interface 423 at a desired height to align with the communicating hole 4127 in the enclosing wall 4125.

The base board 411 further comprise a stopper member 4114 at an inner side of the retaining pad 415 and is upwardly extended from the board body 4111. When the charging end portion 201 of the digital payment currency visual card 200 is inserted into the clamping slot 413, the distal end of the charging end portion 201 of the digital payment currency visual card 200 is biasing against the stopper member 4114, so that the stopper member 4114 stops the further movement of the charging end portion 201 of the digital payment currency visual card 200 is biasing against the stopper member 4114, so as to restrict the position of the charging end portion 201 of the digital payment currency visual card 200 is biasing against the stopper member 4114 within the clamping slot 413 of the clamp body 410 for precisely aligning the two charging pins 422 with the two charging contact areas 202 of the charging end portion 201 of the digital payment currency visual card 200.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A digital currency payment visual card system, comprising:

a digital currency payment visual card comprising a card body, a display module provided on said card body, a controller and a positioning module, wherein said controller is communicated with said display module and said positioning module, wherein said controller is arranged to complete transaction payment and output transaction information to said display module for displaying, wherein said positioning module is arranged to generate location information which is sent to an external device for locating said digital currency payment visual card; and a charging assembly for electrically charging the digital currency payment visual card, wherein said charging assembly is a charging wallet comprising a first part, a second part, a power supply component, and a magnetic attracting element, wherein said first part and said second part are relatively foldable to be close to or away from each other, wherein said power supply component is provided on one of said first part and said second part, wherein when said first part is folded to said second part, said magnetic attracting element is arranged to attract said card body of said digital currency payment visual card between said first part and said second part so as to allow said power supply component to charge said digital currency payment visual card.

2. A digital currency payment visual card system, comprising:

a digital currency payment visual card comprising a card body, a display module provided on said card body, a controller and a positioning module, wherein said controller is communicated with said display module and said positioning module, wherein said controller is arranged to complete transaction payment and output transaction information to said display module for displaying, wherein said positioning module is arranged to generate location information which is sent to an external device for locating said digital currency payment visual card; and a charging assembly for electrically charging the digital currency payment visual card, wherein said charging assembly is a charging wallet comprising a first part, a second part, an electrostatic conversion device for converting static electricity from a human body, and a magnetic attracting element, wherein said first part and said second part are relatively foldable to be close to or away from each other, wherein said electrostatic conversion device is provided on one of said first part and said second part, wherein when said first part is folded to said second part, said magnetic attracting element is arranged to attract said card body of said digital currency payment visual card between said first part and said second part so as to allow said electrostatic conversion device to charge said digital currency payment visual card.

3. The digital currency payment visual card system according to claim 1, wherein one of said first part and said second part is provided with two first connectors on a surface thereof, wherein said card body is provided with two second connectors, and said first connectors are electrically connected to said power supply component, wherein when said card body is attracted by said magnetic member between said first part and said second part, said first connectors are respectively electrically connected to said second connectors, so that said power supply component is used to charge said digital currency payment visual card.

4. The digital currency payment visual card system according to claim 2, wherein one of said first part and said second part is provided with two first connectors on a surface thereof, wherein said card body is provided with two second connectors, and said first connectors are electrically connected to said electrostatic conversion device, wherein when said card body is attracted by said magnetic member between said first part and said second part, said first connectors are respectively electrically connected to said second connectors, so that said electrostatic conversion device is used to charge said digital currency payment visual card.

5. A digital currency payment visual card system, comprising:

a digital currency payment visual card comprising a card body, a display module provided on said card body, a controller and a positioning module, wherein said controller is communicated with said display module and said positioning module, wherein said controller is arranged to complete transaction payment and output transaction information to said display module for displaying, wherein said positioning module is arranged to generate location information which is sent to an external device for locating said digital currency payment visual card; and a charging assembly for electrically charging the digital currency payment visual card, wherein said charging assembly comprises a charging clamp which comprises a charging unit and a clamp body, wherein said clamp body comprises a base board and a movable clip which is pivotally movable with respect to said base board defining a clamping slot, wherein said digital currency payment visual card comprises a charging end portion, wherein when said charging end portion of said digital currency payment visual card is inserted into said clamping slot and is retained between said movable clip and said base body, said charging unit is electrically connected to said charging end portion of said digital currency payment visual card.

6. The digital currency payment visual card system according to claim 5, wherein said charging unit comprises a charging circuit and two charging pins electrically connected to said charging circuit, wherein said charging end portion of said digital currency payment visual card comprises two charging contact areas which are respectively electrically connected to said two charging pins when said charging end portion of said digital currency payment visual card is retained in said clamping slot.

7. The digital currency payment visual card system according to claim 6, wherein said movable clip has a receiving cavity for receiving said charging circuit and comprises an assembling plate under said charging circuit to separate said charging circuit from said charging end portion of said digital currency payment visual card, wherein said assembling pate has two penetrating holes for said two charging pins to pass therethrough.

8. The digital currency payment visual card system according to claim 6, wherein said charging clamp further comprises a retaining pad made of anti-skidding material on said base board for retaining said charging end portion of said digital currency payment visual card in said clamping slot when said charging end portion of said digital currency payment visual card is inserted into said clamping slot.

9. The digital currency payment visual card system according to claim 7, wherein said charging clamp further comprises a retaining pad made of anti-skidding material on said base board for retaining said charging end portion of said digital currency payment visual card in said clamping slot when said charging end portion of said digital currency payment visual card is inserted into said clamping slot.

10. The digital currency payment visual card system according to claim 8, wherein said base board comprises a board body and a stopper member extended from said board body to block movement of said charging end portion of said digital currency payment visual card, so as to retain said charging end portion of said digital currency payment visual card in said clamping slot.

11. The digital currency payment visual card system according to claim 9, wherein said base board comprises a board body and a stopper member extended from said board body to block movement of said charging end portion of said digital currency payment visual card, so as to retain said charging end portion of said digital currency payment visual card in said clamping slot.

12. The digital currency payment visual card system according to claim 10, wherein said board body has an accommodating groove for receiving said retaining pad.

13. The digital currency payment visual card system according to claim 6, wherein said charging unit further comprises an electrical connecting interface electrically connected to said charging circuit.

14. The digital currency payment visual card system according to claim 13, wherein said charging assembly further comprises an electrical connecting wire that is arranged to be electrically connected to said electrical connecting interface, and an electrical connector plug that is electrically connected to said electrical connecting wire.

15. The digital currency payment visual card system according to claim 5, wherein said clamp body further comprises a resetting mechanism which comprises a pivot pin connected to said movable clip and said base board, one or more torsional springs connected to said pivot pin between said movable clip and said base board for restoring original position of said movable clip when said charging end portion of said digital currency payment visual card is removed from said clamping slot.

16. The digital currency payment visual card system according to claim 15, wherein said base board comprises a board body and two fixing members extended from the board body at two sides thereof, wherein said movable clip comprises a clip body and two retaining members extended from said clip body at two sides thereof, wherein each end of said pivot pin is connected to one said fixing member and one said retaining member.

17. The digital currency payment visual card system according to claim 7, wherein said clamp body further comprises a resetting mechanism which comprises a pivot pin connected to said movable clip and said base board, one or more torsional springs connected to said pivot pin between said movable clip and said base board for restoring original position of said movable clip when said charging end portion of said digital currency payment visual card is removed from said clamping slot.

* * * * *